(12) United States Patent
Jung et al.

(10) Patent No.: US 10,694,446 B2
(45) Date of Patent: Jun. 23, 2020

(54) METHOD AND APPARATUS FOR TRANSMITTING AND RECEIVING DATA IN COMMUNICATION SYSTEM

(71) Applicant: Samsung Electronics Co., Ltd, Gyeonggi-do (KR)

(72) Inventors: Ha-Kyung Jung, Seoul (KR); Beom-Sik Bae, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/344,471

(22) Filed: Nov. 4, 2016

(65) Prior Publication Data
US 2017/0135023 A1   May 11, 2017

(30) Foreign Application Priority Data

Nov. 6, 2015  (KR) .......................... 10-2015-0155674

(51) Int. Cl.
*H04W 40/12*   (2009.01)
*H04W 84/04*   (2009.01)
*H04W 92/10*   (2009.01)

(52) U.S. Cl.
CPC .......... *H04W 40/12* (2013.01); *H04W 84/042* (2013.01); *H04W 92/10* (2013.01)

(58) Field of Classification Search
CPC ... H04W 40/12; H04W 84/042; H04W 92/10; H04W 40/00–38; H04W 28/00; H04W 28/02; H04W 28/0231; H04W 28/0236; H04W 28/0242; H04W 28/0247–0289; H04W 28/12; H04W 40/20–205
See application file for complete search history.

(56) References Cited

U.S. PATENT DOCUMENTS

| | | | | |
|---|---|---|---|---|
| 6,952,396 B1 * | 10/2005 | Cottreau | ............. | H04L 12/2852 370/222 |
| 8,144,714 B1 * | 3/2012 | Buchko | ................... | H04L 51/30 370/229 |
| 8,842,631 B2 * | 9/2014 | Horn | ..................... | H04W 36/02 370/331 |
| 9,106,520 B2 * | 8/2015 | Scott | ..................... | H04L 43/106 |
| 9,954,790 B2 * | 4/2018 | Hwang | ................. | H04L 47/323 |
| 2002/0080750 A1 * | 6/2002 | Belcea | ................. | H04W 40/08 370/337 |
| 2005/0074010 A1 * | 4/2005 | Kim | ........................ | H04L 45/60 370/394 |

(Continued)

FOREIGN PATENT DOCUMENTS

WO    WO 2015/020507 A1    2/2015
WO    WO 2015/020508 A1    2/2015

*Primary Examiner* — Mehmood B. Khan

(57) ABSTRACT

The present disclosure relates to a pre-5th-generation (5G) or 5G communication system for supporting higher data rates beyond 4th-generation (4G) communication systems such as a long term evolution (LTE) system. The disclosure includes a first evolved node B (eNB) in a communication system supporting dual connectivity. The first eNB includes a controller configured to detect that a path between a second eNB and a terminal is blocked, and a transmitter configured to transmit, to the terminal, a first data unit of a plurality of data units to be transmitted through the path between the second eNB and the terminal.

20 Claims, 16 Drawing Sheets

(56) References Cited

U.S. PATENT DOCUMENTS

| | | | | |
|---|---|---|---|---|
| 2006/0221993 A1* | 10/2006 | Liao | H04W 74/06 | 370/449 |
| 2007/0110015 A1* | 5/2007 | Chakraborty | H04W 48/20 | 370/338 |
| 2008/0025208 A1* | 1/2008 | Chan | H04L 12/42 | 370/217 |
| 2008/0089287 A1* | 4/2008 | Sagfors | H04W 36/026 | 370/331 |
| 2009/0296631 A1* | 12/2009 | Takahashi | H04L 12/1881 | 370/328 |
| 2010/0098024 A1* | 4/2010 | Nagatake | H04W 36/02 | 370/331 |
| 2010/0284397 A1* | 11/2010 | Poulin | H04L 12/66 | 370/352 |
| 2011/0268085 A1* | 11/2011 | Barany | H04W 36/0033 | 370/331 |
| 2011/0268088 A1* | 11/2011 | Lindskog | H04L 1/1874 | 370/331 |
| 2013/0343178 A1* | 12/2013 | Ankaiah | H04W 24/04 | 370/221 |
| 2014/0269632 A1* | 9/2014 | Blankenship | H04W 76/15 | 370/329 |
| 2014/0286156 A1* | 9/2014 | Kohli | H04B 15/00 | 370/225 |
| 2014/0341109 A1* | 11/2014 | Cartmell | H04L 45/308 | 370/328 |
| 2015/0023149 A1* | 1/2015 | Tochio | H04L 45/28 | 370/217 |
| 2015/0043435 A1* | 2/2015 | Blankenship | H04L 69/322 | 370/329 |
| 2015/0045035 A1* | 2/2015 | Nigam | H04W 36/30 | 455/436 |
| 2015/0049707 A1* | 2/2015 | Vajapeyam | H04W 24/10 | 370/329 |
| 2015/0133122 A1* | 5/2015 | Chen | H04W 36/04 | 455/436 |
| 2015/0223178 A1* | 8/2015 | Pietraski | H04W 52/40 | 370/252 |
| 2015/0264699 A1* | 9/2015 | Fwu | H04L 5/003 | 370/329 |
| 2015/0264738 A1* | 9/2015 | Lee | H04W 76/18 | 370/228 |
| 2015/0326371 A1* | 11/2015 | Baek | H04L 5/00 | 455/450 |
| 2015/0326456 A1* | 11/2015 | Dudda | H04L 47/14 | 370/252 |
| 2015/0351079 A1* | 12/2015 | Himayat | H04W 28/08 | 370/329 |
| 2015/0359028 A1* | 12/2015 | Iyer | H04W 28/08 | 370/329 |
| 2015/0365872 A1* | 12/2015 | Dudda | H04W 36/0055 | 455/436 |
| 2016/0007403 A1* | 1/2016 | Futaki | H04W 4/30 | 370/338 |
| 2016/0037406 A1* | 2/2016 | Centonza | H04W 36/04 | 370/332 |
| 2016/0066222 A1* | 3/2016 | Makinen | H04W 74/006 | 370/331 |
| 2016/0088127 A1* | 3/2016 | Cai | H04L 69/28 | 370/328 |
| 2016/0212680 A1* | 7/2016 | Talukdar | H04W 40/12 | |
| 2016/0219458 A1* | 7/2016 | Kubota | H04W 28/0273 | |
| 2016/0219475 A1* | 7/2016 | Kim | H04W 28/08 | |
| 2016/0219604 A1* | 7/2016 | Fujishiro | H04W 72/085 | |
| 2016/0277987 A1* | 9/2016 | Chen | H04L 5/0085 | |
| 2016/0295614 A1* | 10/2016 | Lee | H04W 48/08 | |
| 2016/0337916 A1* | 11/2016 | Deenoo | H04W 36/0094 | |
| 2017/0013513 A1* | 1/2017 | Agarwal | H04W 84/045 | |
| 2017/0099611 A1* | 4/2017 | Henttonen | H04W 8/00 | |
| 2017/0135151 A1* | 5/2017 | Fujishiro | H04W 36/14 | |
| 2017/0171777 A1* | 6/2017 | Laselva | H04W 24/10 | |
| 2017/0188248 A1* | 6/2017 | Muller | H04L 43/0864 | |
| 2017/0208526 A1* | 7/2017 | Madan | H04W 36/32 | |
| 2017/0273036 A1* | 9/2017 | Pietraski | H04W 52/346 | |
| 2017/0318504 A1* | 11/2017 | Zhang | H04W 36/0055 | |
| 2017/0318508 A1* | 11/2017 | Berglund | H04W 36/0072 | |
| 2017/0325133 A1* | 11/2017 | Worrall | H04W 36/0027 | |
| 2018/0020500 A1* | 1/2018 | Pelletier | H04W 74/04 | |
| 2018/0035483 A1* | 2/2018 | Nagasaka | H04W 72/0406 | |
| 2018/0123752 A1* | 5/2018 | De Benedittis | H04W 24/10 | |
| 2018/0310205 A1* | 10/2018 | Frenger | H04W 24/04 | |

* cited by examiner

| PDU Type | | | | | | 1 |
|---|---|---|---|---|---|---|
| Number of rerouted X2-U Sequence Number ranges reported | | | | | | 1 |
| Start of rerouted X2-U Sequence Number range | | | | | | 4*(Number of rerouted X2-U Sequence Number ranges reported) |
| End of rerouted X2-U Sequence Number range | | | | | | |

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Spare | Blockage Ind. | Final Frame Ind. | Lost Packet Report | 1 |
| Highest successfully delivered PDCP Sequence Number | | | | | | | | 2 |
| Desired buffer size for the E-RAB | | | | | | | | 4 |
| Minimum desired buffer size for the UE | | | | | | | | 4 |
| Number of lost X2-U Sequence Number ranges reported | | | | | | | | 1 |
| Start of lost X2-U Sequence Number range | | | | | | | | 4*(Number of rerouted lost X 2-u SN ranges) |
| End of lost X2-U Sequence Number range | | | | | | | | |
| Spare extension | | | | | | | | 0-4 |

FIG.10

METHOD AND APPARATUS FOR TRANSMITTING AND RECEIVING DATA IN COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed on Nov. 6, 2015 in the Korean Intellectual Property Office and assigned Serial No. 10-2015-0155674, the entire disclosure of which is incorporated herein by reference.

TECHNICAL FIELD

The present disclosure relates to an apparatus and method for transmitting and receiving data in a communication system, and more particularly, to an apparatus and method for transmitting and receiving data in a communication system supporting dual connectivity.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

A communication network in a general 5G system is generated in a form that a coverage of a master evolved node B (MeNB) of which a coverage is equal to or larger than a threshold coverage overlaps with a coverage of a secondary evolved node B (SeNB) of which a coverage is smaller than the threshold coverage. Here, the term MeNB may be interchangeable with the term anchor evolved node B (eNB), and the term SeNB may be interchangeable with the term small eNB, assisting eNB, and slave eNB.

At this time, dual connectivity that one terminal is connected to two or more than two eNBs in a communication system may be implemented in order to a terminal to perform a communication through at least two of eNBs configuring at least one serving cell.

The dual connectivity is configured in order that a terminal may use radio resources provided by at least two different network points, e.g., an MeNB and an SeNB at the same time in a radio resource control (RRC) connected (RRC_CONNECTED) mode. At this time, the at least two different network points are connected one another through an X2 interface using an ideal backhaul or a non-ideal backhaul.

A conventional communication system has provided an evolved packet system (EPS) bearer service to a terminal through a radio bearer (RB) of one eNB.

However, one EPS bearer service has been provided to a terminal through an RB which is set to each of an MeNB and an SeNB, not an RB of one eNB, from a 3rd generation partnership project (3GPP) release-12 (Rel-12), and a bearer form operated like this will be referred to as split bearer.

In the split bearer, an S1-U connection from an evolved packet core (EPC) is terminated at an MeNB, and packet data convergence protocol (PDCP) data is delivered through an X2-U interface between the MeNB and an SeNB. For this, the MeNB performs a routing operation of determining to transmit data of one EPS bearer through which one of a transmission path through the MeNB and a transmission path through an SeNB, and the terminal should perform an operation of sequentially reorders data received from the MeNB and data received from the SeNB according to a sequence number (SN).

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for transmitting and receiving data in a communication system supporting dual connectivity.

Another aspect of the present disclosure is to propose an apparatus and method for transmitting and receiving routing information in a communication system supporting dual connectivity.

Another aspect of the present disclosure is to propose an apparatus and method for changing a preset routing path, and transmitting and receiving data through the changed routing path in a communication system supporting dual connectivity.

Another aspect of the present disclosure is to propose an apparatus and method for transmitting and receiving data using a transmission control protocol (TCP) layer thereby minimizing transmission delay in a communication system supporting dual connectivity.

In accordance with an aspect of the present disclosure, an operating method of a first evolved node B (eNB) in a communication system supporting dual connectivity is provided. The operating method includes detecting that a path between a second eNB and a terminal is blocked; and transmitting, to the terminal, a first data unit of a plurality of data units to be transmitted through the path between the second eNB and the terminal.

In accordance with another aspect of the present disclosure, an operating method of a second evolved node B (eNB) in a communication system supporting dual connectivity is provided. The operating method includes detecting that a path between a second eNB and a terminal is blocked; and transmitting, to a first eNB, information indicating that the path between the second eNB and the terminal is blocked.

In accordance with still another aspect of the present disclosure, an operating method of a terminal in a communication system supporting dual connectivity is provided. The operating method includes detecting that a path between a first evolved node B (eNB) and a terminal is blocked; transmitting, to a second eNB, information indicating that the path between the first eNB and the terminal is blocked; and receiving, from the second eNB, a first data packet of a plurality of data packets to be transmitted through the path between the first eNB and the terminal.

In accordance with still another aspect of the present disclosure, an operating method of an evolved packet core (EPC) in a communication system supporting dual connectivity is provided. The operating method includes transmitting and receiving a message including information indicating that a retransmission function is able to be performed with a terminal through a transmission control protocol (TCP) layer; and receiving a retransmission request message including information related to a data packet which should be retransmitted through the TCP layer, and transmitting the data packet through the TCP layer based on the retransmission request message.

In accordance with still another aspect of the present disclosure, a first evolved node B (eNB) in a communication system supporting dual connectivity is provided. The first eNB includes a controller configured to detect that a path between a second eNB and a terminal is blocked; and a transmitter configured to transmit, to the terminal, a first data unit of a plurality of data units to be transmitted through the path between the second eNB and the terminal.

In accordance with still another aspect of the present disclosure, a second evolved node B (eNB) in a communication system supporting dual connectivity is provided. The second eNB includes a controller configured to detect that a path between a second eNB and a terminal is blocked; and a transmitter configured to transmit, to a first eNB, information indicating that the path between the second eNB and the terminal is blocked.

In accordance with still another aspect of the present disclosure, a terminal in a communication system supporting dual connectivity is provided. The terminal includes a controller configured to detect that a path between a first evolved node B (eNB) and a terminal is blocked; a transmitter configured to transmit, to a second eNB, information indicating that the path between the first eNB and the terminal is blocked; and a receiver configured to receive, from the second eNB, a first data packet of a plurality of data packets to be transmitted through the path between the first eNB and the terminal.

In accordance with still another aspect of the present disclosure, an evolved packet core (EPC) in a communication system supporting dual connectivity is provided. The EPC includes a controller configured to control a transceiver to transmit and receive a message including information indicating that a retransmission function is able to be performed with a terminal through a transmission control protocol (TCP) layer; and the transceiver configured to receive a retransmission request message including information related to a data packet that should be retransmitted through the TCP layer, and to transmit the data packet through the TCP layer based on the retransmission request message.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 schematically illustrates another example of a format of an X2-UP protocol frame in a communication system supporting dual connectivity according to an embodiment of the present disclosure;

Throughout the drawings, it should be noted that like reference numbers are used to depict the same or similar elements, features, and structures.

DETAILED DESCRIPTION

Figure 1:
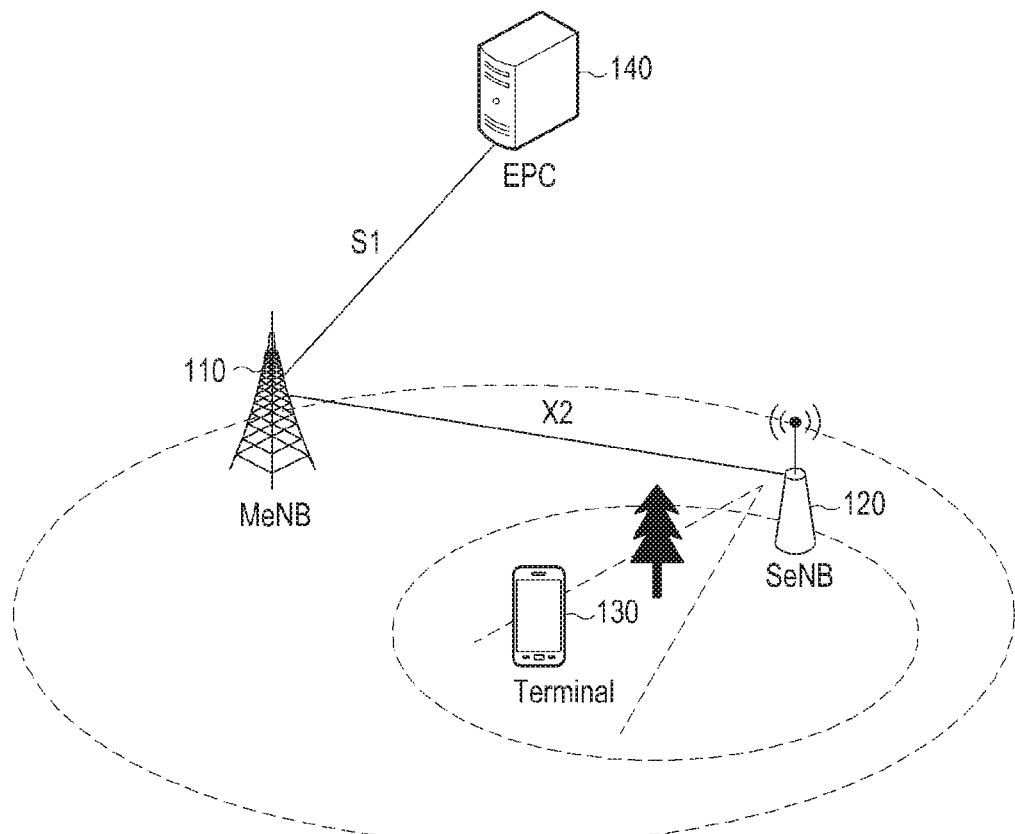
FIG. 1 schematically illustrates an example of a structure of a communication system supporting dual connectivity according to an embodiment of the present disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HIVID), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a transmitting apparatus or a receiving apparatus may be a terminal.

According to various embodiments of the present disclosure, a transmitting apparatus or a receiving apparatus may be an evolved node B (eNB).

In various embodiments of the present disclosure, it will be noted that the term terminal may be interchangeable with the term user equipment (UE), wireless communication terminal, mobile station (MS), wireless terminal, mobile device, and/or the like.

In various embodiments of the present disclosure, it will be noted that the term eNB may be interchangeable with the term access point (AP), base station (BS), and/or the like.

An embodiment of the present disclosure provides an apparatus and method for transmitting and receiving data in a communication system supporting dual connectivity.

An embodiment of the present disclosure provides an apparatus and method for transmitting and receiving routing information in a communication system supporting dual connectivity.

An embodiment of the present disclosure provides an apparatus and method for changing a preset routing path, and transmitting and receiving data through the changed routing path in a communication system supporting dual connectivity.

An embodiment of the present disclosure provides an apparatus and method for transmitting and receiving data using a transmission control protocol (TCP) layer thereby minimizing transmission delay in a communication system supporting dual connectivity.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSDPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

An example of a structure of a communication system supporting dual connectivity according to an embodiment of the present disclosure will be described with reference to FIG. 1.

FIG. 1 schematically illustrates an example of a structure of a communication system supporting dual connectivity according to an embodiment of the present disclosure.

Referring to FIG. 1, the communication system includes a master evolved node B (MeNB) 110, a secondary eNB (SeNB) 120, a terminal 130, and an evolved packet core (EPC) 140. The term MeNB may be interchangeable with the term anchor eNB, and the term SeNB may be interchangeable with the term small eNB, assisting eNB, and slave eNB.

The terminal 130 is located at an area where a coverage of the MeNB 110 overlaps with a coverage of the SeNB 120, and may configure dual connectivity and communicate with the MeNB 110 and the SeNB 120 at the same time based on the dual connectivity. According to the routing result of the MeNB 110, a part of data transmitted from the EPC 140 to the MeNB 110 may be directly transmitted from the MeNB 110 to the terminal 130 and the remaining part of the data may be transmitted to the terminal 130 through the SeNB 120. At this time, data between the EPC 140 and the MeNB 110 is transmitted and received through an S1 interface, and data between the MeNB 110 and the SeNB 120 is transmitted and received through an X2 interface.

A frequency link, e.g., an F1 frequency link is allocated to the MeNB 110, and a frequency link, e.g., an F2 frequency link is allocated to the SeNB 120. The terminal 130 may receive data through a path for the F2 frequency link from the SeNB 120 while receiving data through a path for the F1 frequency link from the MeNB 110.

An example of a structure of a communication system supporting dual connectivity according to an embodiment of the present disclosure has been described with reference to FIG. 1, and an example of a layer structure of a communication system supporting dual connectivity according to an embodiment of the present disclosure will be described with reference to FIG. 2.

Figure 2:
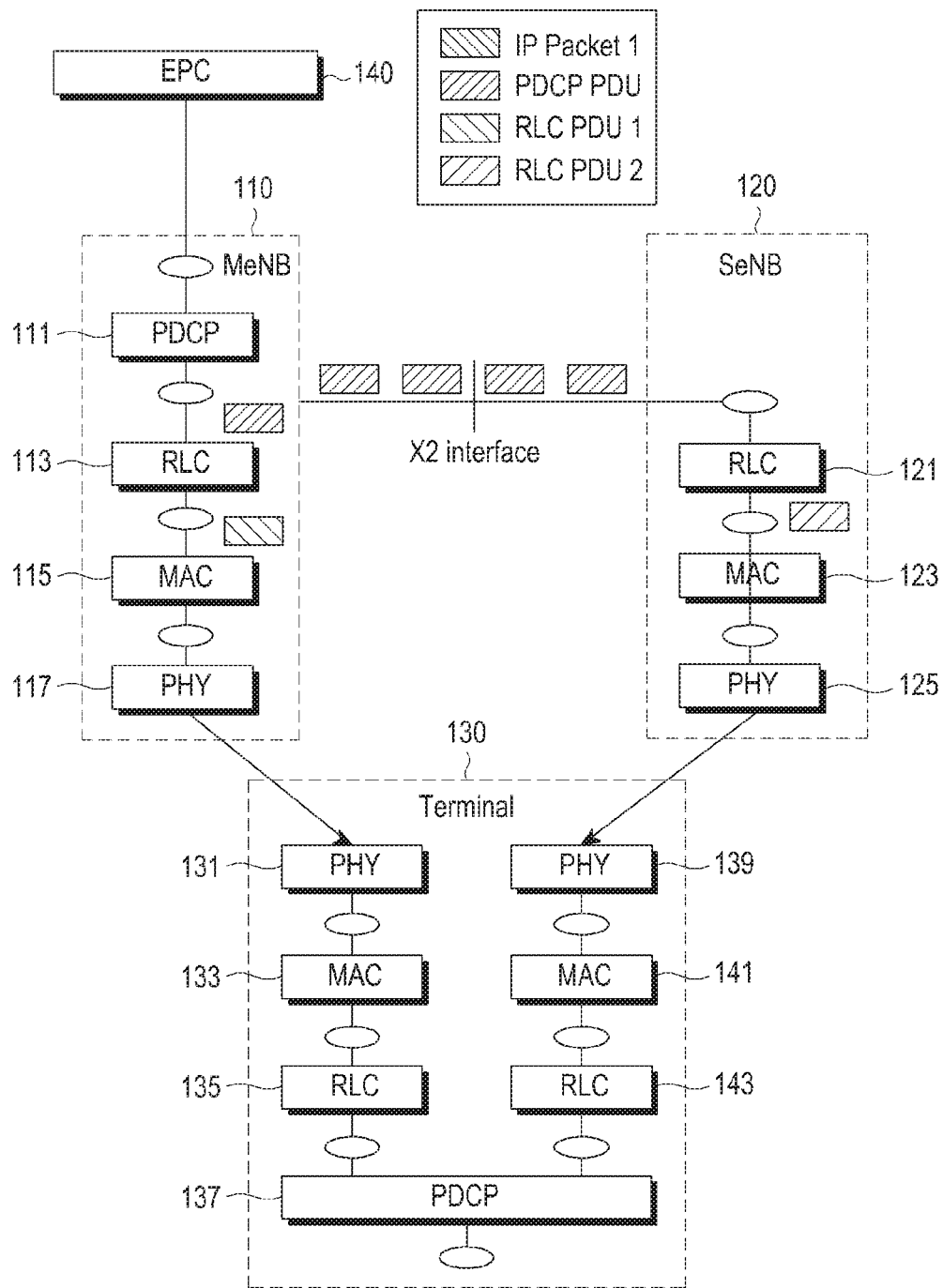
FIG. 2 schematically illustrates an example of a layer structure of a communication system supporting dual connectivity according to an embodiment of the present disclosure.

FIG. 2 schematically illustrates an example of a layer structure of a communication system supporting dual connectivity according to an embodiment of the present disclosure.

Referring to FIG. 2, the communication system includes an MeNB 110, an SeNB 120, a terminal 130, and an EPC 140. The MeNB 110 receives data from one EPS bearer from the EPC 140, and each of the MeNB 110 and the SeNB 120 configures one resource block (RB) for the EPS bearer.

The MeNB 110 includes a packet data convergence protocol (PDCP) layer 111, a radio link control (RLC) layer 113, a medium access control (MAC) layer 115, and a physical (PHY) layer 117, and the SeNB 120 includes an RLC layer 121, a MAC layer 123, and a PHY layer 125.

The PDCP layer 111 in the MeNB 110 receives a PDCP service data unit (SDU) from the EPC 140, generates a PDCP protocol data unit (PDU) based on the PDCP SDU, and transmits a part of the PDCP PDU to the RLC layer 113 in the MeNB 110 and the remaining part of the PDCP PDU to the RLC layer 121 in the SeNB 120 according to a defined rule. A process in which a path through which a PDCP PDU will be transmitted is determined and the PDCP PDU is transmitted through the determined path will be referred to as routing process.

A pair of radio protocol entities is configured for one EPS bearer in the terminal 130. That is, in the terminal 130, a PDCP layer 137, an RLC layer 135, a MAC layer 133, and a PHY layer 131 which correspond to the MeNB 110 are configured, and an RLC layer 143, a MAC layer 141 and a PHY layer 139 which correspond to the SeNB 120 are configured.

The PDCP layer 137 is an entity which shares a PDCP PDU transmitted from the MeNB 110 and a PDCP PDU transmitted from the SeNB 120 at the same time. That is, one PDCP layer, i.e., the PDCP layer 137 interfaces with the RLC layer 113 included in the MeNB 110 and the RLC layer 121 included in the SeNB 120 at the same time.

In the terminal 130, the PDCP layer 137 has a function of sequentially reordering a PDCP PDU received through the MeNB 110 and PDCP PDUs which is non-sequentially received through the SeNB 120 according to a sequence number (SN).

Further, in a case that a PDCP PDU is transmitted through a plurality of paths in a communication system, non-sequential reception for the PDCP PDU occurs in the terminal 130 due to difference among transmission delays among the plurality of paths. In a case that there is a PDCP PDU which is non-sequentially stored at a reception buffer in the PDCP layer 137, the terminal 130 receives a PDCP PDU after waiting during the difference among the transmission delays among the plurality of paths and starts a reordering timer for delivering the received PDCP PDU to an upper layer. The reordering timer which has been started stops if a PDCP PDU corresponding to an SN which causes the reordering timer to be started is delivered to the upper layer. If the reordering timer expires in the PDCP layer 137, a PDCP PDU corresponding to an SN which is less than the SN which causes the reordering timer to be started among PDCP PDUs stored at the reception buffer up to now is delivered to the upper layer.

The MeNB 110 is connected to the SeNB 120 through an X2 interface. That is, the PDCP layer 111 in the MeNB 110 routes a part of a PDCP PDU to the RLC layer 121 in the SeNB 120 through an X2 interface. Further, an X2-user plane (UP) protocol for the SeNB 120 to exchange feedback information with the MeNB 110 for flow control of adjusting amount of data to be transmitted between the MeNB 110 and the SeNB 120 is defined.

The X2-UP protocol provides at least one of information related to an X2-UP dedicated SN to be used for data transmission between the MeNB 110 and the SeNB 120, information related to the greatest SN among SNs of PDCP PDUs which have been successfully transmitted from the SeNB 120 to the terminal 130, information related to SNs which have failed in transmission to the terminal 130, information related to a current-desired buffer size per bearer, and information related to a current-minimum desired buffer size per terminal.

A process of transmitting and receiving data among an EPC 140, an MeNB 110, an SeNB 120, and a terminal 130 included in a communication system as described in FIG. 2 will be described with reference to FIG. 3.

Figure 3:
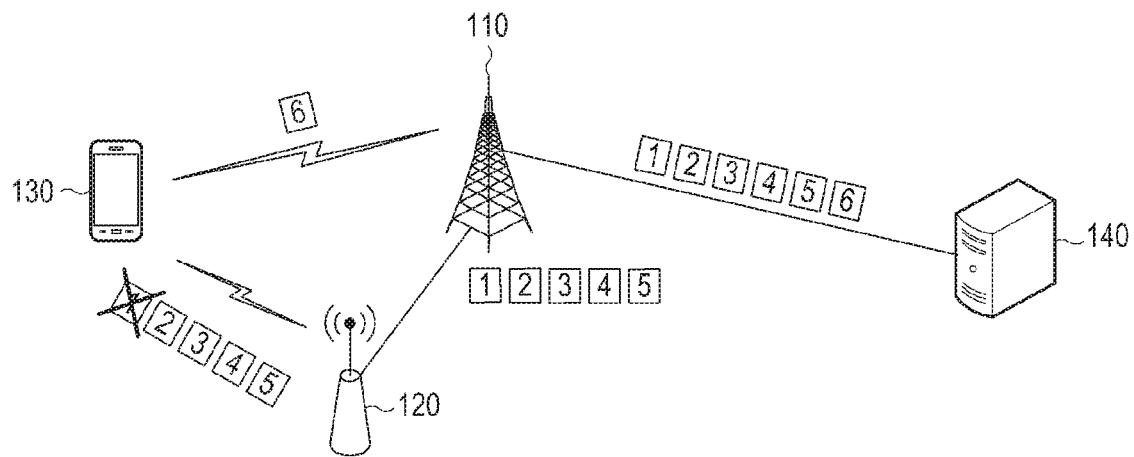
FIG. 3 schematically illustrates an example of a process of transmitting and receiving data in a communication system supporting dual connectivity according to an embodiment of the present disclosure.

FIG. 3 schematically illustrates an example of a process of transmitting and receiving data in a communication system supporting dual connectivity according to an embodiment of the present disclosure.

In FIG. 3, it will be assumed that an MeNB 110 receives six data units, e.g., six PDCP SDUs, generates six PDCP PDUs based on the received six PDCP SDUs, and determines to route PDCP PDUs which correspond to SNs 1 to 5 to an SeNB 120 and route a PDCP PDU which corresponds to an SN 6 to a terminal 130.

The SeNB 120 transmits the PDCP PDUs which correspond to the SNs 1 to 5 received from the MeNB 110 to the terminal 130 through a path for an F2 frequency link. If the terminal 130 does not receive the PDCP PDU corresponding to the SN 1 and successfully receives the PDCP PDUs corresponding to the SNs 2 to 5 due to various reasons such as a channel error, and/or the like, the terminal 130 stores the PDCP PDUs corresponding to the SNs 2 to 5 at a reception buffer and starts a reordering timer.

The PDCP PDU corresponding to the SN 1 has been lost due to various reasons such as a channel error, and/or the like, so there is no possibility that the PDCP PDU corresponding to the SN 1 is being transmitted through a path different from the path for the F2 frequency link after delay and the terminal 130 waits until the reordering timer expires. Due to this, the PDCP layer 137 in the terminal 130 results in additional delay on data transmission to an upper layer, e.g., a transmission control protocol (TCP) layer. If the F2 frequency link is an mmW band, time of a reordering timer should be set to relatively long time by considering instability of the mmW band, so it is predicted that this will affect throughput of data transmission to an upper layer.

An embodiment of the present disclosure provides a scheme for decreasing delay time for data reordering. For this, in an embodiment of the present disclosure, the MeNB 110 transmits routing information including information related to PDCP PDUs transmitted per path to the terminal 130. At this time, the MeNB 110 may transmit the routing information to the terminal 130 after or before starting transmission of PDCP PDUs.

Another example of a process of transmitting and receiving data in a communication system supporting dual connectivity according to an embodiment of the present disclosure will be described with reference to FIG. 4.

Figure 4:
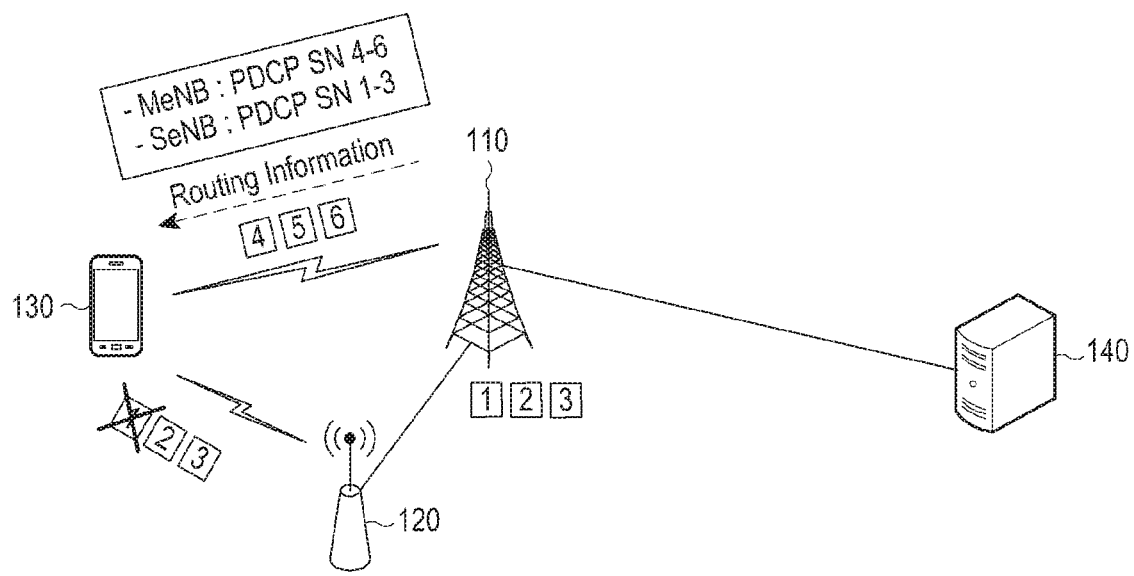
FIG. 4 schematically illustrates another example of a process of transmitting and receiving data in a communication system supporting dual connectivity according to an embodiment of the present disclosure.

FIG. 4 schematically illustrates another example of a process of transmitting and receiving data in a communication system supporting dual connectivity according to an embodiment of the present disclosure.

Referring to FIG. 4, it will be assumed that an MeNB 110 supports an LTE frequency band, and an SeNB 120 supports an mmW band. An embodiment of the present disclosure may be applied to a case that a frequency band used in the MeNB 110 is different from a frequency band used in the SeNB 120. In FIG. 4, it will be assumed that the MeNB 110 receives six data units, e.g., six PDCP SDUs, generates six PDCP PDUs based on the received six PDCP SDUs, and determines to route PDCP PDUs corresponding to SNs 1 to 3 to the SeNB 120 and route PDCP PDUs corresponding to SNs 4 to 6 to a terminal 130.

The MeNB 110 transmits routing information including the routing result as described above to the terminal 130. The routing information includes information about an SN range for a PDCP PDU routed per transmission path or a PDCP PDU to be routed per transmission path. For example, the routing information includes information indicating that the SeNB 120 determines to route the PDCP PDUs corresponding to the SNs 1 to 3 and the MeNB 110 determines to route the PDCP PDUs corresponding to the SNs 4 to 6. The routing information is transmitted to the terminal 130 through a PDCP Control PDU.

A format of a PDCP Control PDU in a communication system supporting dual connectivity according to an embodiment of the present disclosure will be described with reference to FIG. 5.

Figure 5:
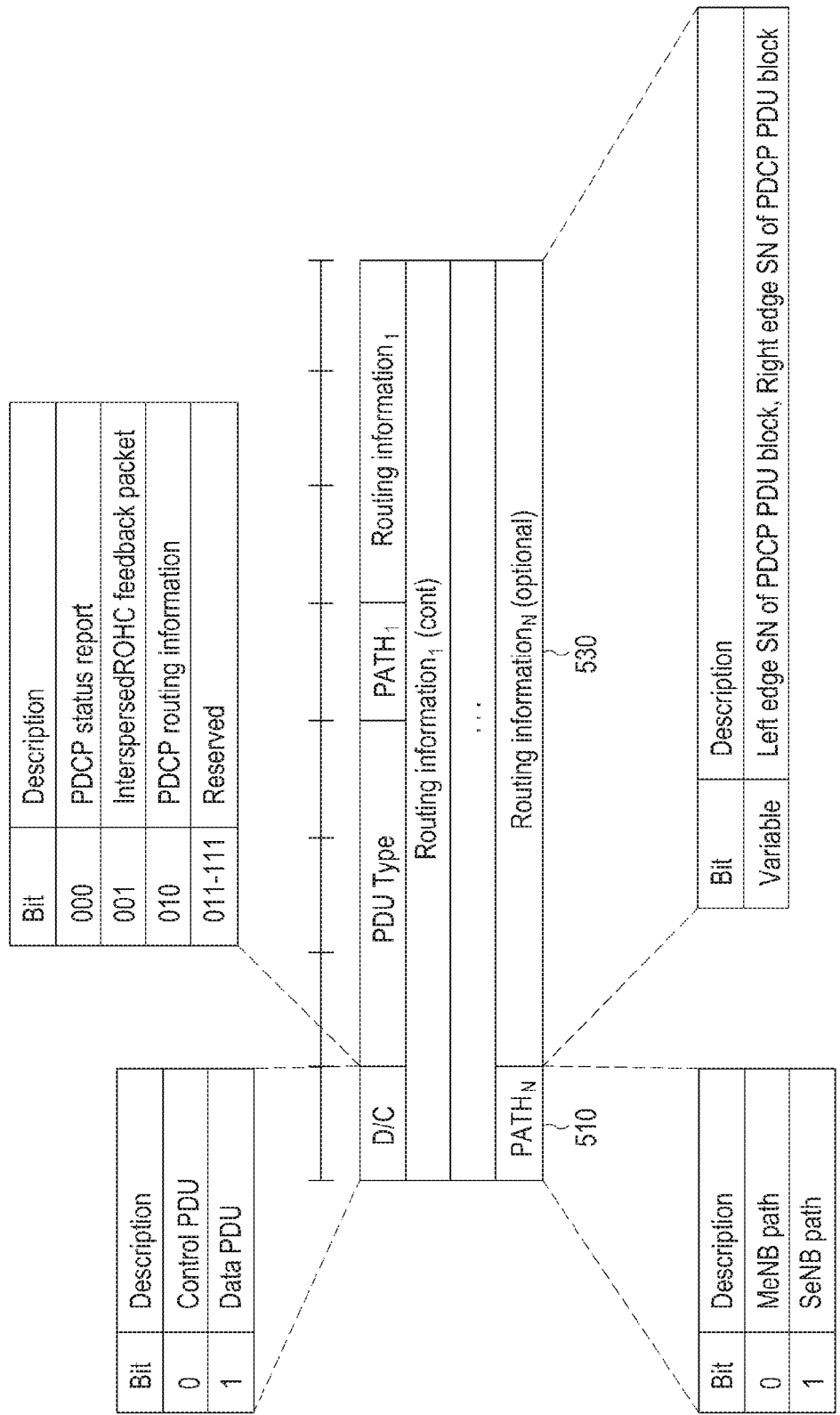
FIG. 5 schematically illustrates a format of a PDCP Control PDU in a communication system supporting dual connectivity according to an embodiment of the present disclosure.

FIG. 5 schematically illustrates a format of a PDCP Control PDU in a communication system supporting dual connectivity according to an embodiment of the present disclosure.

Referring to FIG. 5, it will be noted that a format of a PDCP Control PDU is used for transmitting routing information.

A PDCP Control PDU includes at least one PATH field 510 and a Routing Information field 530.

The PATH field 510 includes information indicating whether a PDCP PDU corresponding to an SN included in the Routing Information field 530 is transmitted through an MeNB path or an SeNB path. If the number of dual connectivity is 2, the PATH field 510 may be implemented with 1 bit. If the number of dual connectivity is equal to or greater than 3, the PATH field 510 may be implemented with two or more than two bits.

The Routing Information field 530 indicates an SN block of a PDCP PDU which is routed or which will be routed through a path which is detected based on the PATH field 510. An SN block denotes continuous SNs. For example, the SN block may be expressed with a pair of the smallest SN among SNs included in the SN block and the largest SN among the SNs included in the SN block. Here, the smallest SN among the SNs included in the SN block will be referred to as Left edge SN, and the largest SN among the SNs included in the SN block will be referred to as Right edge SN.

It is most effective for an MeNB 110 to transmit a PDCP Control PDU as shown in FIG. 5 used for transmitting routing information to the terminal 130 before routing data. However, for convenience, the MeNB 110 may transmit the routing information to the terminal 130 at time such as the middle of data routing or the end of data routing.

Referring back to FIG. 4, an SeNB 120 transmits PDCP PDUs corresponding to SNs 1 to 3 received from an MeNB 110 to a terminal 130 through a path with a link of an mmW band, and the terminal 130 does not receive the PDCP PDU corresponding to the SN1 due to various reasons such as a channel error, and/or the like. The terminal 130 may receive a PDCP PDU corresponding to an SN 2 from the SeNB 120 and may receive a PDCP PDU corresponding to an SN 4 from the MeNB 110.

A case that the terminal 130 receives the PDCP PDU corresponding to the SN 2 from the SeNB 120 will be described below.

The terminal 130 knows that the PDCP PDUs corresponding to the SNs 1 to 3 will be transmitted through the SeNB 120 based on routing information transmitted through a PDCP Control PDU. An RLC layer 143 in the terminal 130 corresponding to the SeNB 120 facilitates in-sequence delivery with an acknowledged mode (AM) operation, so it will be predicted that transmission of the PDCP PDU, which is normally received, corresponding to the SN 1 which is less than an SN 2 failed in a lower layer of a PDCP layer 137 due to various reasons such as a channel error, and/or the like.

The PDCP layer 137 in the terminal 130 processes reception of the PDCP PDU corresponding to the SN 1 as loss, and delivers the PDCP PDU corresponding to the SN2 which has been received up to now to an upper layer. At this time, an embodiment of the present disclosure does not expect delayed transmission through other path by starting a reordering timer unlike a conventional technology, so unnecessary delay time does not occur.

A case that the terminal 130 receives a PDCP PDU corresponding to an SN 4 from the MeNB 110.

The terminal 130 knows that PDCP PDUs corresponding to SNs 4 to 6 will be transmitted through the MeNB 110 based on routing information transmitted through a PDCP Control PDU. So, the terminal 130 may be confident that PDCP PDUs corresponding to SNs 1 to 3 which are not received yet are being transmitted through other path, and wait for reception for the PDCP PDUs through the other path by starting a reordering timer.

When the terminal receives the PDCP PDU corresponding to the SN 2, an RLC layer 143 in the terminal 130 facilitates in-sequence delivery with an AM operation, so the terminal 130 may be confident that transmission of the PDCP PDU corresponding to the SN 1 which is less than an SN 2 of the PDCP PDU which is normally received failed in a lower layer of a PDCP layer 137 due to various reasons such as a channel error, and/or the like. So, the PDCP layer 137 in the terminal 130 may process reception of the PDCP PDU corresponding to the SN 1 as loss and deliver the PDCP PDU corresponding to the SN2 which has been received up to now to an upper layer.

In a method as described in FIG. 2, when data which is not received at a reception buffer, the PDCP layer 137 in the terminal 130 regards that the data is not received due to difference among transmission delays among paths and starts a reordering timer, so unnecessary delay occurs and transmission efficiency of an upper layer decreases due to various reasons such as a channel error, and/or the like.

However, in an embodiment of the present disclosure, an MeNB 110 transmits routing information to a terminal 130, so a PDCP layer 137 in the terminal 130 may operate a reordering timer by effectively classifying delay due to packet loss and delay due to difference between transmission delays between paths. So, the terminal 130 may reduce delay which occurs in a process of sequentially reordering data.

Although minimizing delay in a process of reordering data as described in an embodiment of the present disclosure, delay due to data reordering may significantly decrease transmission efficiency for data transmission to an upper layer if difference among transmission delays among paths is very large.

If an F2 frequency band of an SeNB 120 is an mmW band, a path through which data is transmitted may be temporarily blocked by an obstacle and/or the like due to a characteristic of the mmW band of which straightness is strong, and the blockage time may be in milliseconds to seconds. In this case, even though a PDCP layer 137 in a terminal 130 successfully receives all data and delivers all of the data to an upper layer, a TCP layer as an upper layer may not deliver a TCP ACK message to a TCP transmission side during reordering delay. This causes retransmission timeout of the TCP transmission side, and a congestion window of the TCP transmission side is initialized thereby significantly decreasing transmission efficiency of a TCP. Further, data transmitted from the PDCP layer 137 to an upper layer, i.e., a TCP layer is also regarded as lost data, so an MeNB 110 performs retransmission.

So, various embodiments of the present disclosure will describe schemes of minimizing difference among delays among paths by performing re-routing in an MeNB 110 when a temporary blockage is detected in a path with a link of an mmW band. Various embodiments of the present disclosure includes an embodiment in which an MeNB performs routing, an embodiment in which an EPC performs routing, an embodiment in which a PDCP layer performs routing, and an embodiment in which a TCP layer performs routing.

An operation in a case that it will be assumed that an MeNB performs a routing process and an SeNB starts data transmission according to the routing result will be described below.

Still another example of a process of transmitting and receiving data in a communication system supporting dual connectivity according to an embodiment of the present disclosure will be described with reference to FIG. 6.

Figure 6:
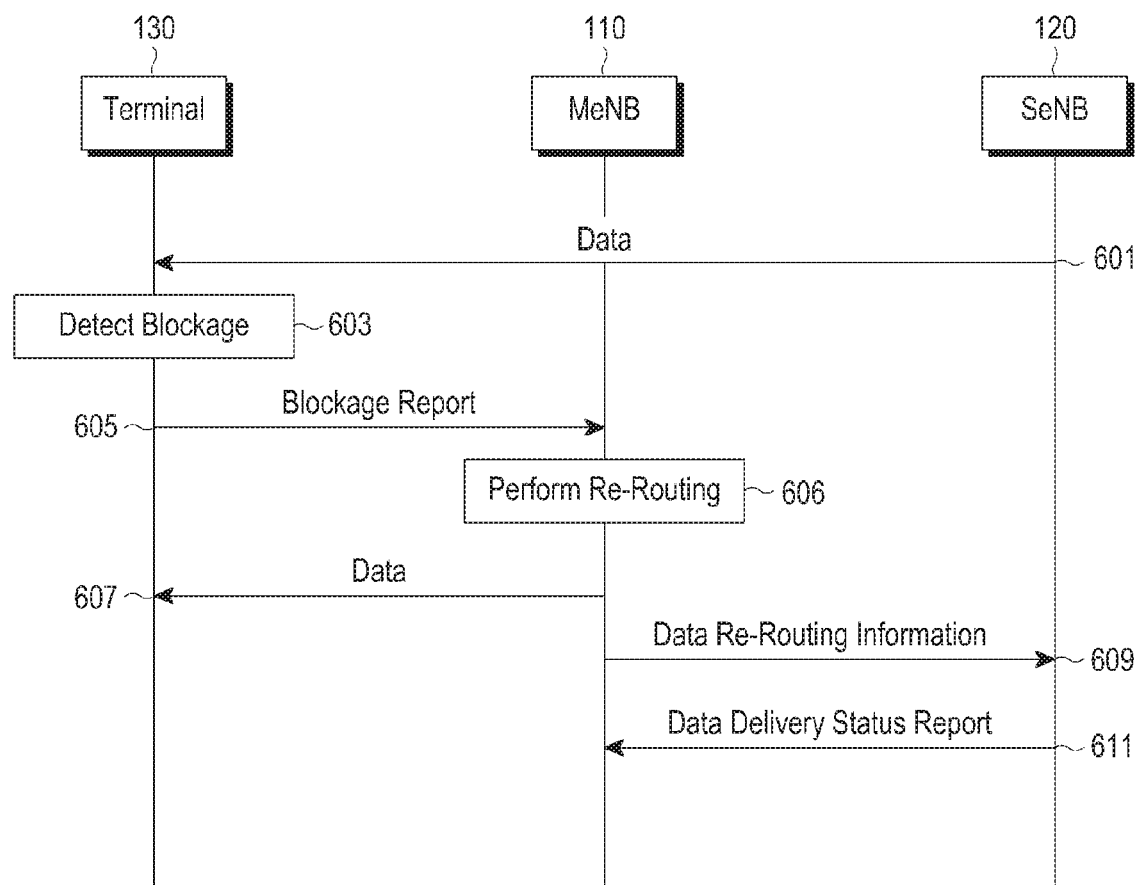
FIG. 6 schematically illustrates still another example of a process of transmitting and receiving data in a communication system supporting dual connectivity according to an embodiment of the present disclosure.

FIG. 6 schematically illustrates still another example of a process of transmitting and receiving data in a communication system supporting dual connectivity according to an embodiment of the present disclosure.

Referring to FIG. 6, in an embodiment of the present disclosure, a terminal 130 detects a temporary blockage in a path with a link of an mmW band and transmits the detected result indicating the temporary blockage to an MeNB 110. In the following description, an SeNB 120 and the terminal 130 transmit and receive data through a path with a link of an mmW band, so it will be understood that blockage of the link of the mmW band is blockage of a path with the link of the mmW band.

The SeNB 120 transmits PDCP data received from the MeNB 110 to the terminal 130 according to the routing result of the MeNB 110 at operation 601. The terminal 130 detects a temporary blockage in the link of the mmW band at operation 603.

Time during which a blockage detected in a path between the terminal 130 and the SeNB 120 lasts may be longer than a preset time or may be equal to or shorter than the preset time according to a mobile speed or a mobile direction. That is, the time during which the blockage is detected in the path between the terminal 130 and the SeNB 120 may be temporary time or permanent time.

A process of detecting a temporary blockage or a permanent blockage of a frequency in a communication system supporting dual connectivity according to an embodiment of the present disclosure will be described with reference to FIG. 7.

Figures 7, 8:
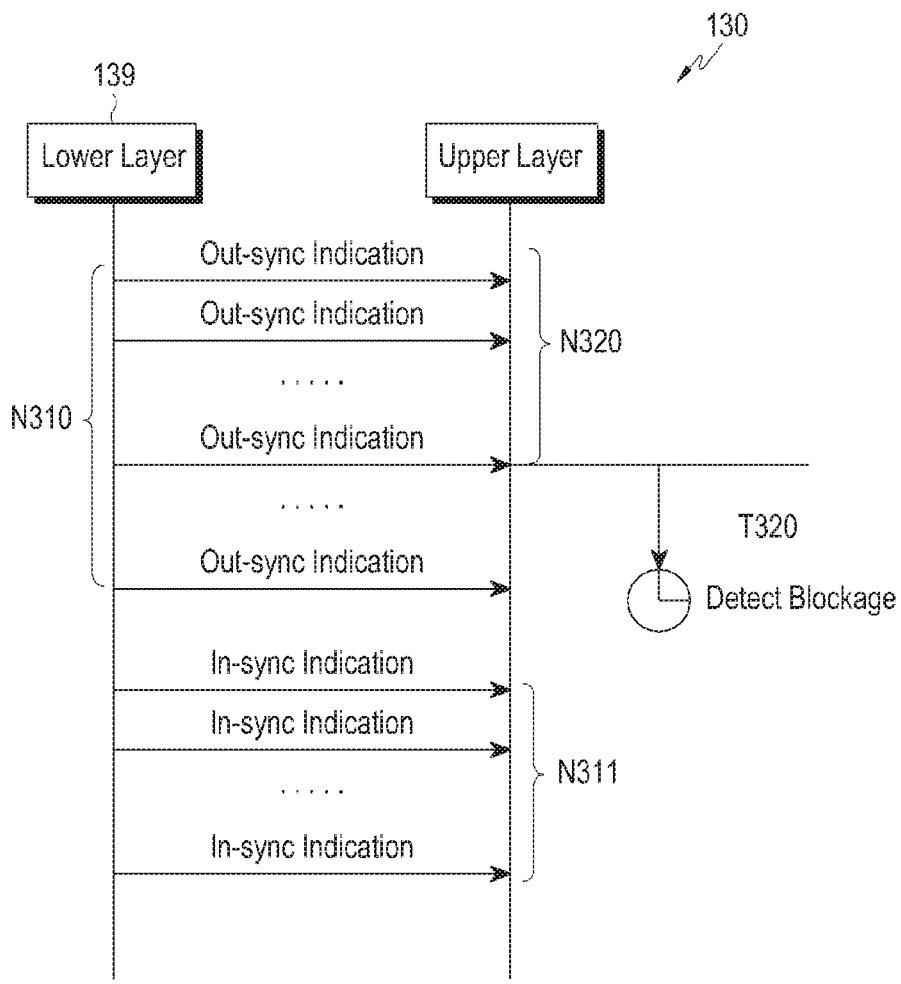
FIG. 7 schematically illustrates a process of detecting a temporary blockage or a permanent blockage of a frequency in a communication system supporting dual connectivity according to an embodiment of the present disclosure.
FIG. 8 schematically illustrates an example of a format of an X2-UP protocol frame in a communication system supporting dual connectivity according to an embodiment of the present disclosure.

FIG. 7 schematically illustrates a process of detecting a temporary blockage or a permanent blockage of a frequency in a communication system supporting dual connectivity according to an embodiment of the present disclosure.

Referring to FIG. 7, a general LTE communication system defines a radio link failure (RLF) operation for detecting a permanent blockage of a link. If an upper layer receives out-of-sync indication of N310 from a lower layer corresponding to an SeNB 120, i.e., a PHY layer 139, a terminal 130 starts a timer of which a default value is set to 1000 ms, e.g., a T310 timer. If the T310 timer expires, the terminal 130 regards that a radio link corresponding to the SeNB 120 is permanently blocked, and reports fail information to an MeNB 110 through a radio resource control (RRC) message.

After receiving the RRC message from the terminal 130, the MeNB 110 checks the fail information reported through the RRC message, and performs the next procedure in which the MeNB 110 changes or releases an SeNB for the terminal 130 according to whether a neighbor SeNB for the terminal 130 exists.

After the T310 timer is started, the terminal 130 stops the T310 timer when receiving in-sync indication of N311 from a PHY layer 139 in the terminal corresponding to the SeNB 120.

In an embodiment of the present disclosure, a new timer and a constant are used for detecting a temporary blockage in a link of an mmW band. For convenience, a timer used for detecting a temporary blockage in a link of an mmW band will be referred to as blockage timer or T320 timer.

Referring back to FIG. 6, the terminal 130 starts a blockage timer (T320 timer) when an upper layer receives out-of-sync indication of N320 from a PHY layer 139 corresponding to the SeNB 120. N320 which triggers detecting a temporary blockage of a link should be set to a value which is less than N310 which triggers detecting a permanent blockage of a link. If the blockage timer expires, the terminal 130 determines that a radio link corresponding to the SeNB 120 is temporarily blocked. In a case that time during which the blockage timer operates is set to a preset value, e.g., 0, if the upper layer receives out-of-sync indication of N320 from the PHY layer 139 corresponding to the SeNB 120, the terminal 130 may determine that the radio link is temporarily blocked without starting the blockage timer.

Upon receiving in-sync indication of N311 from a lower layer corresponding to the SeNB 120, i.e., the PHY layer 139, after the blockage timer is started in an upper layer, the terminal 130 stops the blockage timer. N320 and T320 are defined in an embodiment of the present disclosure, and the names thereof may be changed.

Upon detecting a temporary blockage in a link of an mmW band using a process of detecting a temporary blockage or a permanent blockage as described in FIG. 7 at operation 603, the terminal 130 transmits a report message indicating that the temporary blockage is detected in the link of the mmW band to the MeNB 110 at operation 605. For example, the report message may be implemented with an RRC message or a status report field in a PDCP Control PDU.

If the report message is implemented with the RRC message, the report message may be implemented with a new message, e.g., a blockage report message or be implemented by including a new information element (IE) into a failure information message used in a general communication system, e.g., an SCGFailureInformation message. The new message or the new IE includes information related to at least one of a current Reordering_PDCP_RX_COUNT and remaining time until a current reordering timer expires.

For another example, the terminal 130 may transmit report indicating that the temporary blockage is detected in the link of the mmW band to the MeNB 110 using a PDCP Control PDU. A format of a general PDCP Control PDU defines that the terminal 130 should transmit status report to the MeNB 110 if the MeNB 110 requests PDCP re-establishment from the terminal 130. So, if status report which is transmitted by the terminal 130 without the request for the PDCP re-establishment from the MeNB 110 is analyzed as report indicating the temporary blockage of the link detected by the terminal 130, the terminal 130 may transmit report indicating that temporary blockage of the link is detected to the MeNB 110 using status report at operation 605.

A PDCP layer 111 in the MeNB 110 performs a re-routing operation in order to directly transmit data which has been routed to the SeNB 120 to a terminal 130 at operation 606. At this time, the MeNB 110 should determine which data among the data which has been routed to the SeNB 120 should be retransmitted to the terminal 130. For example, the MeNB 110 may determine a packet to be re-routed per priority by considering a possibility that transmission in the SeNB 120 will be resumed according to recovery of the mmW link as expressed in Table 1.

In Table 1, each of Step 1 to Step 3 may denote a priority.

Step 1 is a re-routing step in which a packet related to start of a reordering timer of the terminal 130 among packets transmitted through a guaranteed bit rate (GBR) bearer is preferentially retransmitted. Further, Reordering_PDCP_RX_COUNT is a parameter delivered when the terminal 130 reports a blockage to the MeNB 110 at operation 605, and means an SN which causes the terminal 130 to start a reordering timer.

The terminal 130 may stop the reordering timer when all of PDCP data with an SN which is less than the SN, i.e., the Reordering_PDCP_RX_COUNT are received. So, the MeNB 110 should determine the PDCP data with the SN which is less than the SN to be preferentially re-routed (the first criterion of Step 1).

Data should be received in the terminal 130 before the reordering timer of the terminal 130 expires, so the MeNB 110 determines the PDCP data with the SN which is less than the SN to be preferentially re-routed if time at which the reordering timer expires ("reorderingTimer expiry time") is longer than expected transmission time (the second criterion of Step 1). An operation in Step 1 may be sequentially determined according to a priority of each of a plurality of GBR bearers if there is a plurality of GBR bearers.

Step 2 is a re-routing step in which a packet related to start of a reordering timer of the terminal 130 among packets transmitted through a Non-GBR bearer is preferentially retransmitted. An operation in Step 2 is similar to an operation in Step 1, and a detailed description thereof will be omitted herein.

Step 3 is a re-routing step in which packets which are not re-routed through Step 1 and Step 2 are retransmitted in ascending order of SN.

A process of Step 1 to a process of Step 3 are sequentially performed by the MeNB 110, and are terminated when the MeNB 110 receives data delivery status report from the SeNB 120 according to recovery of an mmW link of the SeNB 120 at operation 611.

FIG. 8 schematically illustrates an example of a format of an X2-UP protocol frame in a communication system supporting dual connectivity according to an embodiment of the present disclosure.

Referring to FIG. 8, it will be noted that a format of an X2-UP protocol frame in FIG. 8 is used for transmitting re-routing information in an MeNB.

An X2-UP protocol frame includes information about an SN of data which is re-routed through a different path even though an MeNB 110 routes the data to an SeNB 120. After receiving the X2-UP protocol frame, the SeNB 120 immediately discards data stored at a buffer based on the information about the SN of the re-routed data thereby the data stored at the buffer is not transmitted to a terminal 130.

The SeNB 120 reports, to the MeNB 110, information about an SN of data which is successfully transmitted to the terminal 130 after a link is recovered through a Downlink (DL) Data Delivery Status frame of an X2-UP protocol frame at operation 611.

After receiving the DL Data Delivery Status frame from the SeNB 120, the MeNB 110 checks the information about the SN included in the received DL Data Delivery Status frame to determine whether new data is successfully transmitted to the terminal 130. If the new data is successfully transmitted to the terminal 130, the MeNB 110 determines that a radio link between the terminal 130 and the SeNB 120 is recovered and terminates the re-routing operation. Thereafter, the MeNB 110 routes a packet received from an EPC140 to the terminal 130 or the SeNB 120 according to a preset rule.

An example of a format of an X2-UP protocol frame in a communication system supporting dual connectivity according to an embodiment of the present disclosure has been described with reference to FIG. 8, and still another example of a process of transmitting and receiving data in a communication system supporting dual connectivity according to an embodiment of the present disclosure will be described with reference to FIG. 9.

TABLE 1

| |
| --- |
| Step1: For all GBR bearers in a decreasing priority order, PDCP PDUs in which |
| 1) SN < Reordering_PDCP_RX_COUNT && |
| 2) reorderingTimer expiry time > expected transmission time     are chosen to be rerouted |
| Step2: For all Non-GBR bearers in a decreasing priority order, PDCP PDUs in which |
| 1) SN < Reordering_PDCP_RX_COUNT && |
| 2) reorderingTimer expiry time > expected transmission time     are chosen to be rerouted |
| Step3: For all bearers, PDCP PDU with lowest SNs are chosen to be rerouted |

Note:
priority may be determined based on remaining reorderingTimer expiry time

The MeNB 110 transmits, to the terminal 130, data which is determined to be re-routed based on Table 1 at operation 607. The MeNB 110 transmits, to the SeNB 120, re-routing information including information about an SN of data which is re-routed and transmitted thereby the SeNB 120 does not transmit the data which is re-routed and transmitted at operation 609. At this time, the MeNB 110 may transmit the re-routing information to the SeNB 120 using an X2-UP protocol frame in FIG. 8.

An example of a format of an X2-UP protocol frame in a communication system supporting dual connectivity according to an embodiment of the present disclosure will be described with reference to FIG. 8.

Figure 9:
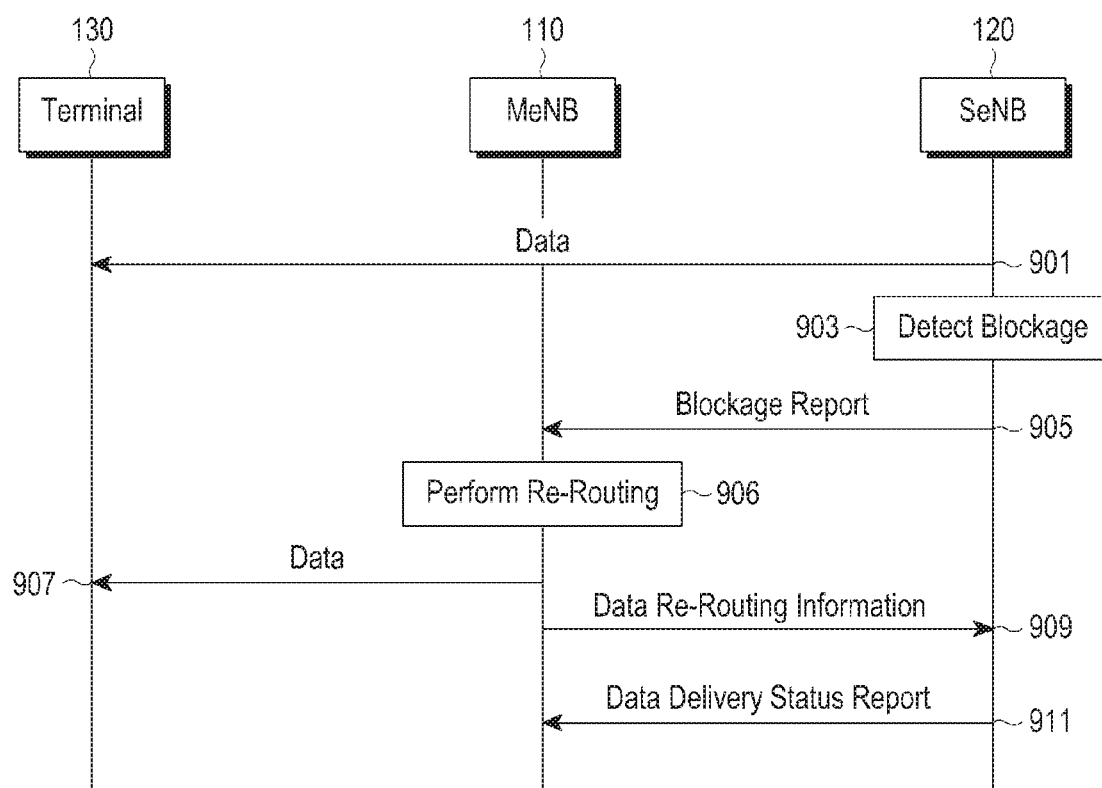
FIG. 9 schematically illustrates still another example of a process of transmitting and receiving data in a communication system supporting dual connectivity according to an embodiment of the present disclosure.

FIG. 9 schematically illustrates still another example of a process of transmitting and receiving data in a communication system supporting dual connectivity according to an embodiment of the present disclosure.

Referring to FIG. 9, it will be noted that a process of transmitting and receiving data in FIG. 9 is a process of transmitting and receiving data in a case that an SeNB 120 detects a temporary blockage in a link of an mmW band and transmits the detected result to an MeNB 110.

The SeNB 120 transmits data according to a routing result of the MeNB 110 at operation 901. The SeNB 120 detects a temporary blockage in a link of an mmW band at operation 903. Here, the SeNB 120 detects that a radio link between the SeNB 120 and the terminal 130 is temporarily blocked if retransmission of the data is not performed up to a predetermined retransmission count in an RLC layer 121 in the SeNB 120.

Upon detecting a temporary blockage of a link at operation 903, the SeNB 120 transmits a Blockage report message to the MeNB 110 at operation 905. At this time, the SeNB 120 may add a new IE to a DL Data Delivery Status frame of an X2-UP protocol in FIG. 10, and transmit the Blockage report message to the MeNB 110 through the added new IE.

Another example of a format of an X2-UP protocol frame in a communication system supporting dual connectivity according to an embodiment of the present disclosure will be described with reference to FIG. 10.

FIG. 10 schematically illustrates another example of a format of an X2-UP protocol frame in a communication system supporting dual connectivity according to an embodiment of the present disclosure.

Referring to FIG. 10, it will be noted that a format of an X2-UP protocol frame in FIG. 10 is used for transmitting blockage detection report in an SeNB.

An X2-UP frame protocol includes a Blockage Indication field 1000. The Blockage Indication field 1000 may be implemented with one bit. For example, if a value of the Blockage Indication field 1000 is "1", it means that a link is temporarily blocked. For example, if a value of the Blockage Indication field 1000 is "0", it means that a link is not temporarily blocked.

Referring back to FIG. 9, the MeNB 110 performs re-routing operation thereby directly transmitting, to the terminal 130, data which the PDCP layer 111 has routed to the SeNB 120 at operation 906. At this time, the MeNB 110 should determine which data among the data which has been routed to the SeNB 120 should be retransmitted to the terminal 130. For example, the MeNB 110 may determine a packet to be re-routed per priority by considering a possibility that transmission in the SeNB 120 will be resumed according to recovery of an mmW link as expressed in Table 2.

In Table 2, each of Step 1 to Step 3 denotes a priority. Step 1 is a re-routing step in which a packet which the SeNB 120 reports as a lost packet through a DL Data Delivery Status message at operation 905 among packets transmitted through a GBR bearer is preferentially retransmitted.

Step 2 is a re-routing step in which packets which the SeNB 120 reports as lost packets through a DL Data Delivery Status message at operation 905 among packets transmitted through a Non-GBR bearer are preferentially retransmitted.

Step 3 is a re-routing step in which packets which are not re-routed through Step 1 and Step 2 are retransmitted in ascending order of SN.

A process of Step 1 to a process of Step 3 are sequentially performed by the MeNB 110, and are terminated when the MeNB 110 receives data delivery status report from the SeNB 120 according to recovery of an mmW link of the SeNB 120 at operation 911.

TABLE 2

Step1: For all GBR bearers in a decreasing priority order,
PDCP PDUs in which loss has been reported by DL Data Delivery Status are chosen to be rerouted TABLE 2-continued Step2: For all Non-GBR bearers in a decreasing priority order,
PDCP PDUs in which loss has been reported by DL Data Delivery Status are chosen to be rerouted
Step3: For all bearers,
PDCP PDUs with low SNs are chosen to be rerouted Note:
priority may be determined based on ARP The MeNB 110 transmits, to the terminal 130, data which is determined to be re-routed based on Table 2 at operation 907. The MeNB 110 transmits, to the SeNB 120, re-routing information including information about an SN of data which is re-routed and transmitted thereby the SeNB 120 does not transmit the data which is re-routed and transmitted at operation 909. At this time, the MeNB 110 may transmit the re-routing information to the SeNB 120 using an X2-UP protocol frame in FIG. 8. A method of transmitting re-routing information from the MeNB 110 to the SeNB 120 using the X2-UP protocol frame has been described with reference to FIGS. 6 to 8, and a detailed description thereof will be omitted herein.

After receiving the X2-UP protocol frame, the SeNB 120 immediately discards data stored at a buffer based on information about an SN of the re-routed data thereby the data stored at the buffer is not transmitted to a terminal 130.

The SeNB 120 reports, to the MeNB 110, information about an SN of data which is successfully transmitted to the terminal 130 after a link is recovered through a DL Data Delivery Status frame of an X2-UP protocol frame at operation 911.

After receiving the DL Data Delivery Status frame from the SeNB 120, the MeNB 110 checks the information about the SN included in the received DL Data Delivery Status frame. The MeNB determines whether new data is successfully transmitted to the terminal 130 based on the information about the SN. If the new data is successfully transmitted to the terminal 130, the MeNB 110 determines that a radio link between the terminal 130 and the SeNB 120 is recovered and terminates the re-routing operation. Thereafter, the MeNB 110 routes a packet received from an EPC140 to the terminal 130 or the SeNB 120 according to a preset rule.

Still another example of a process of transmitting and receiving data in a communication system supporting dual connectivity according to an embodiment of the present disclosure will be described with reference to FIG. 11.

Figure 11:
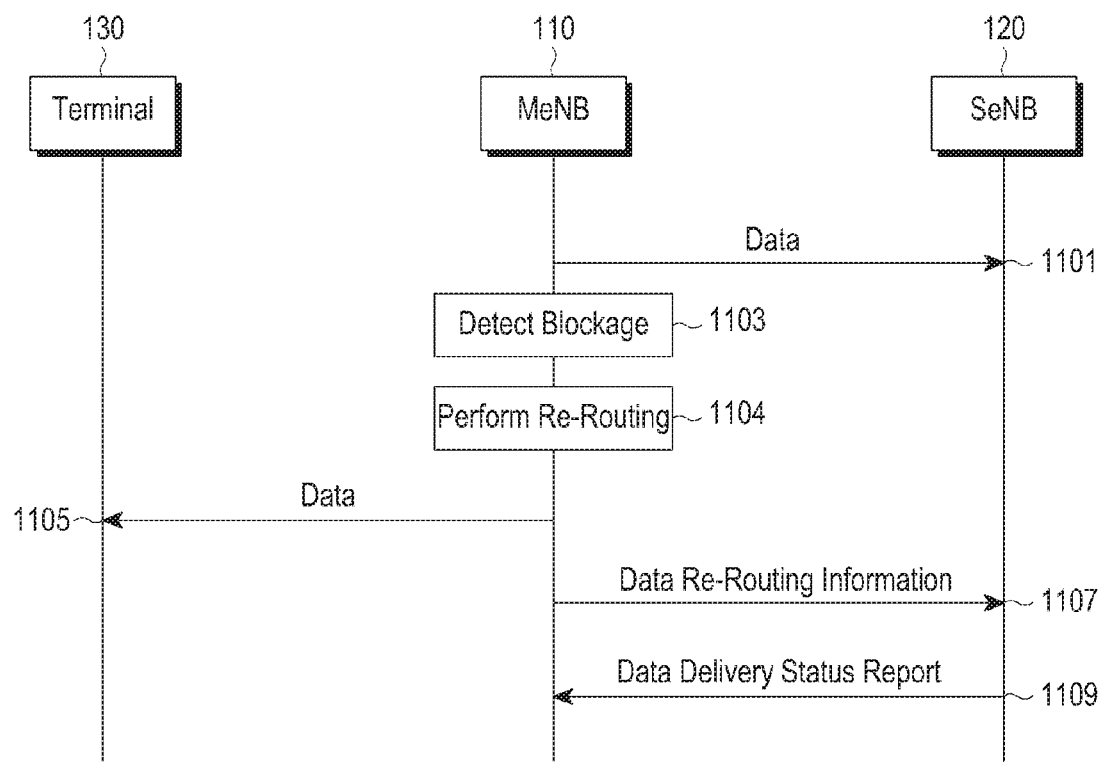
FIG. 11 schematically illustrates still another example of a process of transmitting and receiving data in a communication system supporting dual connectivity according to an embodiment of the present disclosure.

FIG. 11 schematically illustrates still another example of a process of transmitting and receiving data in a communication system supporting dual connectivity according to an embodiment of the present disclosure.

Referring to FIG. 11, it will be noted that a process of transmitting and receiving data in FIG. 11 is a process of transmitting and receiving data in a case that an MeNB detects a temporary blockage in a link of an mmW band.

The MeNB 110 transmits a part of data to an SeNB 120 according to the determined result for routing at operation 1101. The MeNB 110 detects a temporary blockage in a link of an mmW band at operation 1103. The MeNB 110 operates a timer for detecting a temporary blockage in a link of an mmW band. A method of operating the timer in the MeNB 110 will be expressed in Table 3.

A method of operating a timer in Table 3 may be understood based on the concepts as described in FIG. 10, so a detailed description will be omitted herein.

TABLE 3

| Start | Stop |
| --- | --- |
| Reception of DL DATA DELIVERY STATUS with lost packet report Reception of DL DATA DELIVERY STATUS with no Highest successfully delivered PDCP Sequence Number update | Reception of DL DATA DELIVERY STATUS which indicates the successful delivery of PDCP Sequence Number that triggered the start of reroutingTimer |

The MeNB 110 performs data re-routing if the timer expires at operation 1104. That is, the MeNB 110 performs re-routing in order to transmit data which has been routed from a PDCP layer 111 to an SeNB 120 to a terminal 130 at operation 1104. The MeNB 110 should determine which data among the data which has been routed to the SeNB 120 should be transmitted to the terminal 130. For example, the MeNB 110 may determine a packet to be re-routed per priority by considering a possibility that transmission in the SeNB 120 will be resumed according to recovery of the mmW link as expressed in Table 2.

The MeNB 110 transmits, to the SeNB 120, re-routing information including information about the SN of the data which is re-routed and transmitted thereby the SeNB 120 does not retransmit the data which is re-routed and transmitted at operation 1107. At this time, the MeNB 110 may transmit the re-routing information to the SeNB 120 using an X2-UP protocol frame in FIG. 8. Here, a method of transmitting the re-routing information from the MeNB 110 to the SeNB 120 using the X2-UP protocol frame has been described with reference to FIGS. 6 to 8, so a detailed description thereof will be omitted herein.

After receiving the X2-UP protocol frame, the SeNB 120 immediately discards data stored in a buffer based on the information about the SN of the re-routed data thereby the data is not transmitted to the terminal 130.

After a link is recovered, the SeNB 120 reports, to the MeNB 110, information about an SN of data which is successfully transmitted to the terminal 130 through a DL Data Delivery Status frame in an X2-UP protocol frame at operation 1109.

The MeNB 110 receives a DL Data Delivery Status frame from the SeNB 120, and checks information about an SN included in the received DL Data Delivery Status frame. The MeNB 110 determines whether new data is successfully transmitted to the terminal 130 based on the checked SN. If the new data is successfully transmitted to the terminal 130, the MeNB 110 determines that a radio link between the terminal 130 and the SeNB 120 is recovered and terminates performing a re-routing operation. The MeNB 110 re-routes a packet received from the EPC 140 to the terminal 130 or the SeNB 120 according to a predetermined rule.

Another example of a structure of a communication system supporting dual connectivity according to an embodiment of the present disclosure will be described with reference to FIG. 12.

Figure 12:
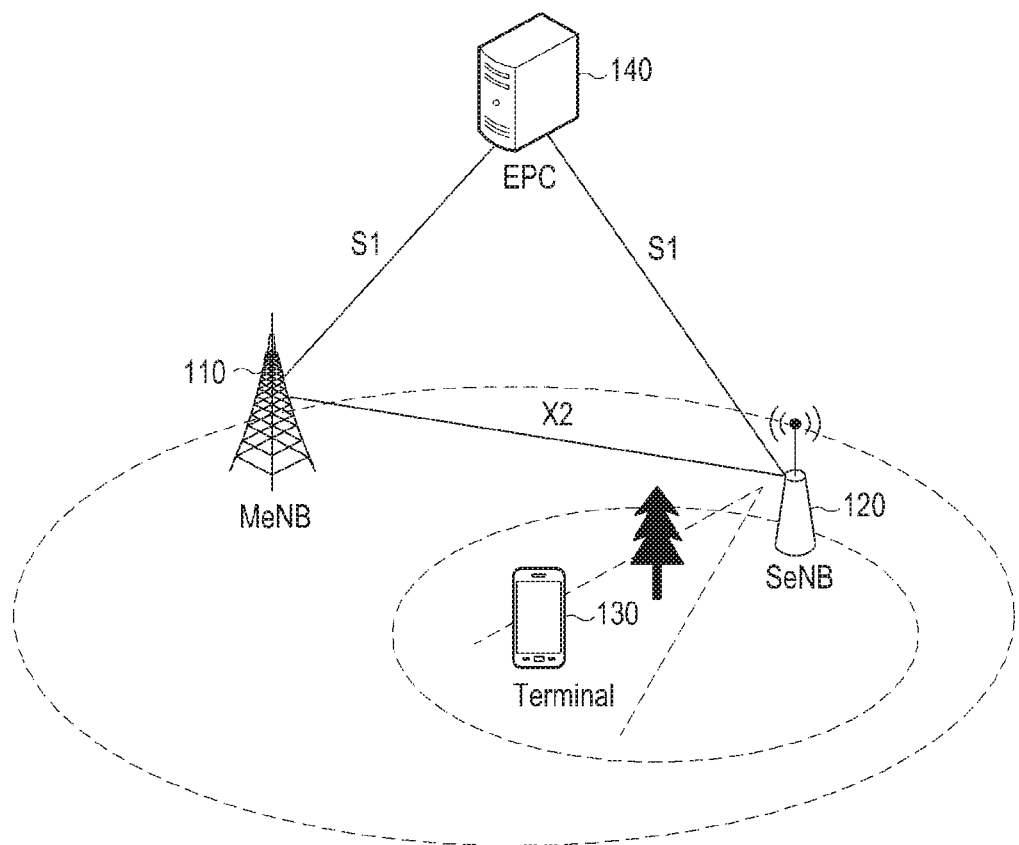
FIG. 12 schematically illustrates another example of a structure of a communication system supporting dual connectivity according to an embodiment of the present disclosure.

FIG. 12 schematically illustrates another example of a structure of a communication system supporting dual connectivity according to an embodiment of the present disclosure.

Referring to FIG. 12, a terminal 130 is located at an area where a coverage of an MeNB 110 overlaps with a coverage of an SeNB 120, and may configure dual connectivity and communicate with the MeNB 110 and the SeNB 120 at the same time. According to this, data transmitted from the EPC 140 is split on a bearer basis in the EPC 140, and the data which is split on the bearer basis may be transmitted to the terminal 130 through each of the MeNB 110 and the SeNB 120. At this time, an F1 frequency band is allocated to the MeNB 110, and an F2 frequency band is allocated to the SeNB 120. The terminal 130 may receive data from the SeNB 120 through the F2 frequency band while receiving data from the MeNB 110 through the F1 frequency band.

A process of transmitting and receiving data thereby minimizing difference among delays among paths in a case that a temporary blockage is detected in a link of an mmW band in a communication system supporting dual connectivity with a structure as described in FIG. 12 will be described with reference to FIGS. 13 and 14.

Figure 13:
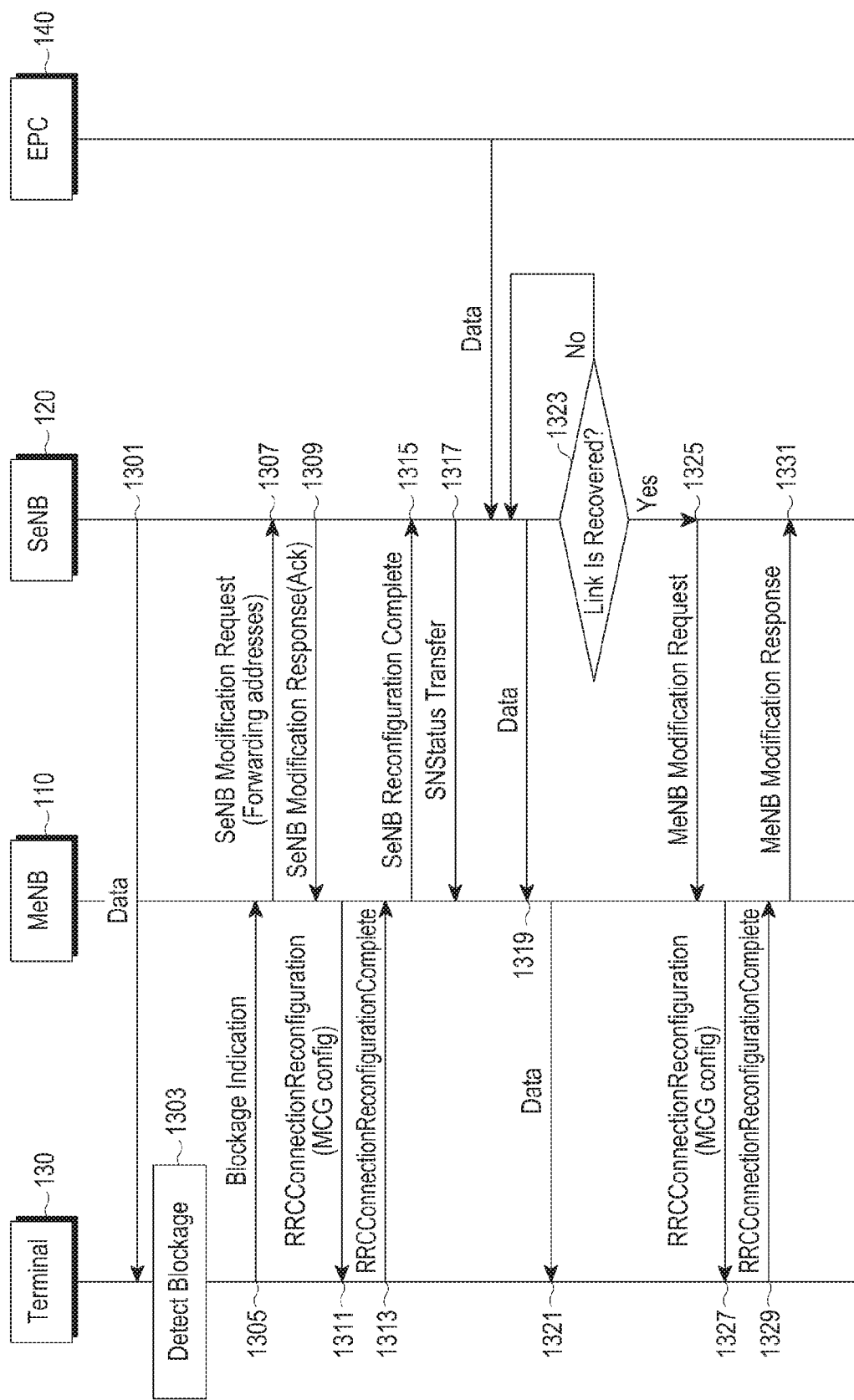
FIG. 13 schematically illustrates still another example of a process of transmitting and receiving data in a communication system supporting dual connectivity according to an embodiment of the present disclosure.
Figure 14:
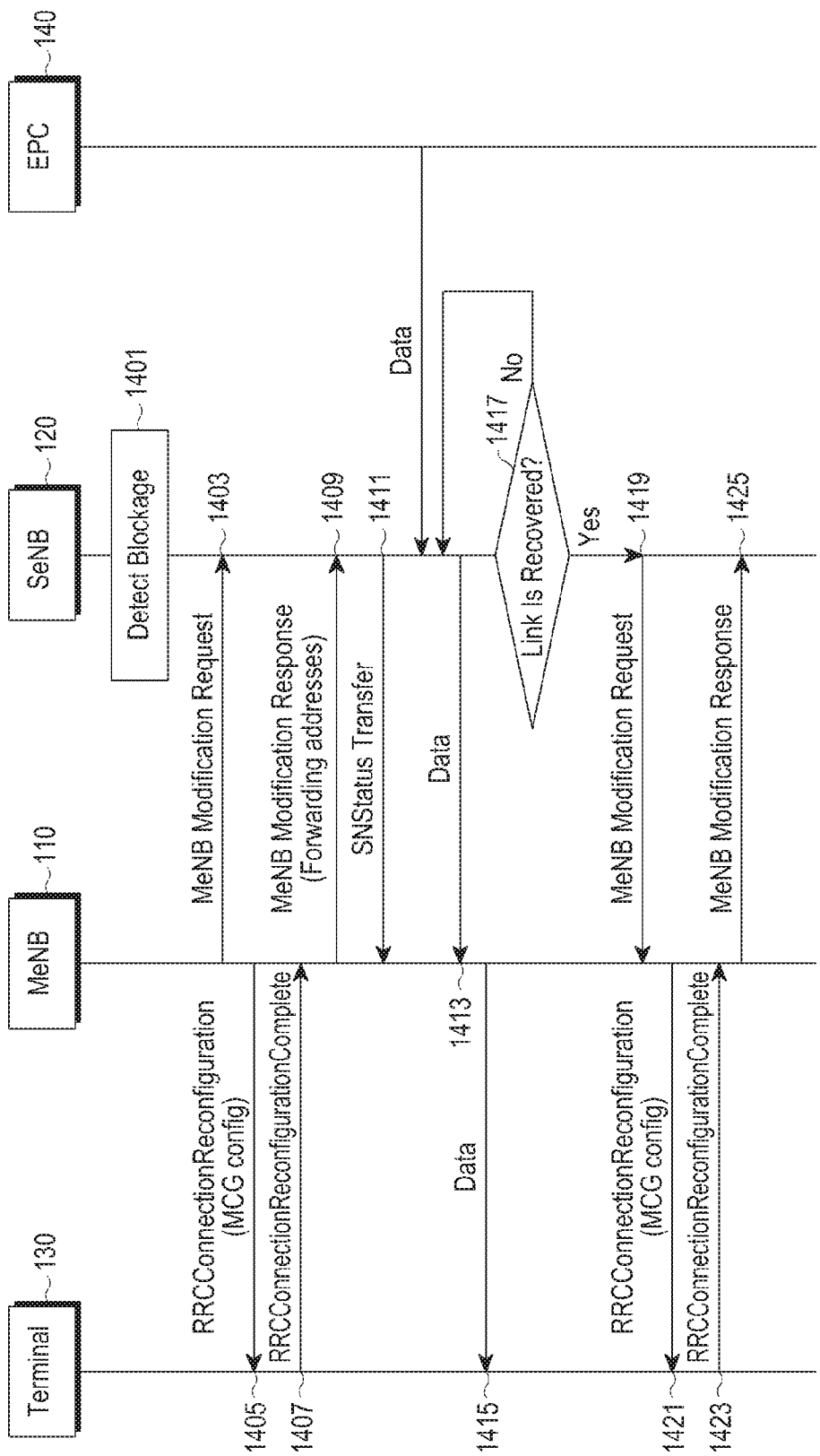
FIG. 14 schematically illustrates still another example of a process of transmitting and receiving data in a communication system supporting dual connectivity according to an embodiment of the present disclosure.

It will be noted that a process of transmitting and receiving data in a communication system supporting dual connectivity according to an embodiment of the present disclosure in FIGS. 13 and 14 is a process of transmitting and receiving data in a case that a new radio bearer between an MeNB and an SeNB is established if a temporary blockage is detected in a link of an mmW band in a terminal or the SeNB, and data buffered at the SeNB is transmitted to the terminal through the MeNB.

In FIGS. 13 and 14, it will be assumed that data split to an MeNB or an SeNB is performed in an EOC, and data transmission from the SeNB to a terminal is started according to the data split result in the EPC.

Still another example of a process of transmitting and receiving data in a communication system supporting dual connectivity according to an embodiment of the present disclosure will be described with reference to FIG. 13.

FIG. 13 schematically illustrates still another example of a process of transmitting and receiving data in a communication system supporting dual connectivity according to an embodiment of the present disclosure.

Referring to FIG. 13, it will be noted that a process of transmitting and receiving data in FIG. 13 is a process of transmitting and receiving data in a case that a new radio bearer between an MeNB and an SeNB is established if a temporary blockage is detected in a link of an mmW band in a terminal, and data buffered at the SeNB is transmitted to the terminal through the MeNB.

In FIG. 13, it will be assumed that data split to the MeNB or the SeNB has been performed in an EPC, and the SeNB starts transmitting data to the terminal according to the data split result in the EPC.

An SeNB 120 transmits data to a terminal 130 according to a split result of an EPC 140 at operation 1301. The terminal 130 detects a temporary blockage in a link of an mmW band at operation 1303. Time during which the link of the mmW band is blocked may be temporary or permanent according to a mobile speed or a mobile direction of the terminal 130. The terminal 130 may detect a temporary blockage or a permanent blockage of a frequency with a method as described in FIGS. 6 to 8. The method of detecting the temporary blockage of the frequency has been described with reference to FIGS. 6 to 8, so a detailed description thereof will be omitted herein.

Upon detecting the temporary blockage of the link at operation 1303, the terminal 130 transmits a report message indicating that the temporary blockage of the link is detected to an MeNB 110 at operation 1305. The terminal 130 may detect the temporary blockage of the link with a scheme as described in FIG. 7. For example, the report message may be implemented with an RRC message or a status report field in a PDCP Control PDU.

The MeNB 110 receives the report message from the terminal 130, and detects that the radio link between the SeNB 120 and the terminal 130 is temporally blocked based on the report message. The MeNB 110 transmits, to the SeNB 120, an SeNB Modification Request message for changing the path between the SeNB 120 and the terminal 130 to a path between the MeNB 110 and the terminal 130 at operation 1307. The SeNB Modification Request message may include information about an address used for setting a tunnel for transmitting and receiving data.

The SeNB receives the SeNB Modification Request message from the MeNB 110, sets up a tunnel for forwarding data with the MeNB 110 based on the SeNB Modification Request message, and notifies that the set up of the tunnel has been completed by transmitting an SeNB Modification Response message to the MeNB 110 at operation 1309. At this time, it will be noted that a radio bearer set up between the SeNB 120 and the terminal 130 is not released and the SeNB 120 repeatedly tries to transmit data to the terminal 130 through a link of an mmW band.

After receiving the SeNB Modification Response message from the SeNB 120, the MeNB 110 transmits an RRCConnectionReconfiguration message to the terminal 130 at operation 1311. The RRCConnectionReconfiguration message includes radio bearer setup information for setting up a radio bearer which is identical to a radio bearer which is set up through the SeNB 120 through the MeNB 110. The terminal 130 sets up a radio bearer based on the radio bearer setup information included in the RRCConnectionReconfiguration message, and transmits an RRCConnectionReconfigurationComplete message to the MeNB 110 at operation 1313.

After receiving the RRCConnectionReconfigurationComplete message from the terminal 130, the MeNB 110 informs that the MeNB 110 is ready to transmit and receive data with the terminal 130 by transmitting an SeNB Reconfiguration Complete message to the SeNB 120 at operation 1315.

After receiving the SeNB Reconfiguration Complete message from the MeNB 110, the SeNB 120 transmits, to the MeNB 110, SN status information including information about an SN of data for which transmission failed or information about an SN of data for which transmission is successful at operation 1317.

The SeNB 120 forwards buffered data to the MeNB 110 using a data transmitting/receiving tunnel which is set up with the MeNB 110 at operation 1319. At this time, the SeNB 120 may delete the data which is forwarded to the MeNB 110 from a transmission buffer of the SeNB 120. The MeNB 110 delivers data received from the SeNB 120 to the terminal 130 at operation 1321.

The SeNB 120 determines whether a radio link with the terminal 130 is recovered at operation 1323. If the radio link is not recovered, the SeNB 120 repetitively performs the forwarding process. If the radio link is recovered, the SeNB 120 informs that the radio link with the terminal 130 is recovered by transmitting an MeNB Modification Request message to the MeNB 110 at operation 1325.

After transmitting all data forwarded from the SeNB 120 to the terminal 130, the MeNB 110 releases a radio bearer set up for data forwarding by transmitting an RRCConnectionReconfiguration message to the terminal 130 at operation 1327. After releasing the radio bearer, the terminal 130 notifies that the radio bearer has been released by transmitting an RRCConnectionReconfigurationComplete message to the MeNB 110 at operation 1329. The MeNB 110 informs that the radio bearer set up for data forwarding between the terminal 130 and the SeNB 120 has been released by transmitting an MeNB Modification Response message to the SeNB 120 at operation 1331.

Still another example of a process of transmitting and receiving data in a communication system supporting dual connectivity according to an embodiment of the present disclosure has been described with reference to FIG. 13, and still another example of a process of transmitting and receiving data in a communication system supporting dual connectivity according to an embodiment of the present disclosure will be described with reference to FIG. 14.

FIG. 14 schematically illustrates still another example of a process of transmitting and receiving data in a communication system supporting dual connectivity according to an embodiment of the present disclosure.

Referring to FIG. 14, it will be noted that a process of transmitting and receiving data in FIG. 14 is a process of transmitting and receiving data in a case that a new radio bearer between an MeNB and an SeNB is established if a temporary blockage is detected in a link of an mmW band in the SeNB, and data buffered at the SeNB is transmitted to the terminal through the MeNB.

In FIG. 14, it will be assumed that data split to MeNB or to SeNB has been performed in an EPC, and the SeNB starts transmitting data to the terminal according to the data split result in the EPC.

An SeNB 120 detects a temporary blockage in a link of an mmW band at operation 1401. The SeNB 120 may detect a temporary blockage of a frequency with a method as described in FIGS. 9 and 10. The method of detecting the temporary blockage of the frequency has been described with reference to FIGS. 9 and 10, so a detailed description thereof will be omitted herein.

The SeNB 120 transmits an MeNB Modification Request message to the MeNB 110 in order to inform that the temporary blockage of the radio link set up with the terminal 130 is detected at operation 1403. The MeNB Modification Request message includes information indicating that the SeNB 120 intends to transmit data buffered in the SeNB 120 through the MeNB 110.

After receiving the MeNB Modification Request message from the SeNB 120, the MeNB 110 transmits an RRCConnectionReconfiguration message to the terminal 130 at operation 1405. The RRCConnectionReconfiguration message includes radio bearer set up information for setting up a radio bearer which is identical to a radio bearer set up through the SeNB 120 through the MeNB 110. The terminal 130 sets up a radio bearer based on the radio bearer set up information included in the RRCConnectionReconfiguration message, and transmits an RRCConnectionReconfigurationComplete message to the MeNB 110 at operation 1407.

After receiving the RRCConnectionReconfigurationComplete message from the terminal 130, the MeNB 110 transmits an MeNB Modification Response message to the SeNB 120 at operation 1409. The MeNB Modification Response message includes information about an address used for the SeNB 120 to set up a tunnel for data forwarding with the MeNB 110.

After receiving the MeNB Modification Request message from the MeNB 110, the SeNB 120 sets up a tunnel for forwarding data with the MeNB 110. At this time, it will be noted that a radio bearer set up between the SeNB 120 and the terminal 130 is not released and the SeNB 120 repeatedly tries to transmit data to the terminal 130 through a radio link.

The SeNB 120 transmits, to the MeNB 110, SN status information including information about an SN of data of which transmission failed or information about an SN of data of which transmission is successful at operation 1411.

The SeNB 120 forwards buffered data to the MeNB 110 using a tunnel for data forwarding set up with the MeNB 110 at operation 1413. The MeNB 110 transmits, to the terminal 130, the data forwarded from the SeNB 120 at operation 1415. At this time, the SeNB 120 may delete the data which the SeNB 120 forwarded from a transmission buffer of the SeNB 120.

The SeNB 120 determines whether a radio link with the terminal 130 is recovered at operation 1417. If the radio link is not recovered, the SeNB 120 repetitively performs the forwarding process. If the radio link is recovered, the SeNB 120 informs that the radio link with the terminal 130 is recovered by transmitting an MeNB Modification Request message to the MeNB 110 at operation 1419.

After transmitting all data forwarded from the SeNB 120 to the terminal 130, the MeNB 110 releases a radio bearer set up for data forwarding by transmitting an RRCConnectionReconfiguration message to the terminal 130 at operation 1421. After releasing the radio bearer, the terminal 130 notifies that the radio bearer has been released by transmitting an RRCConnectionReconfigurationComplete message to the MeNB 110 at operation 1423. The MeNB 110 informs that the radio bearer set up for data forwarding between the terminal 130 and the SeNB 120 has been released by transmitting an MeNB Modification Response message to the SeNB 120 at operation 1425.

So, in an embodiment of the present disclosure, that in a process of transmitting and receiving data in FIGS. 12 to 14, a blockage of a radio link set up between a terminal and an SeNB is detected in the terminal or the SeNB, the terminal may receive, from an MeNB, data which is not normally received from the SeNB.

A process of transmitting and receiving data in a case that a split is performed in an EPC according to an embodiment of the present disclosure has been described above, and still another example of a process of transmitting and receiving data in a communication system supporting dual connectivity according to an embodiment of the present disclosure will be described with reference to FIG. 15.

Figure 15:
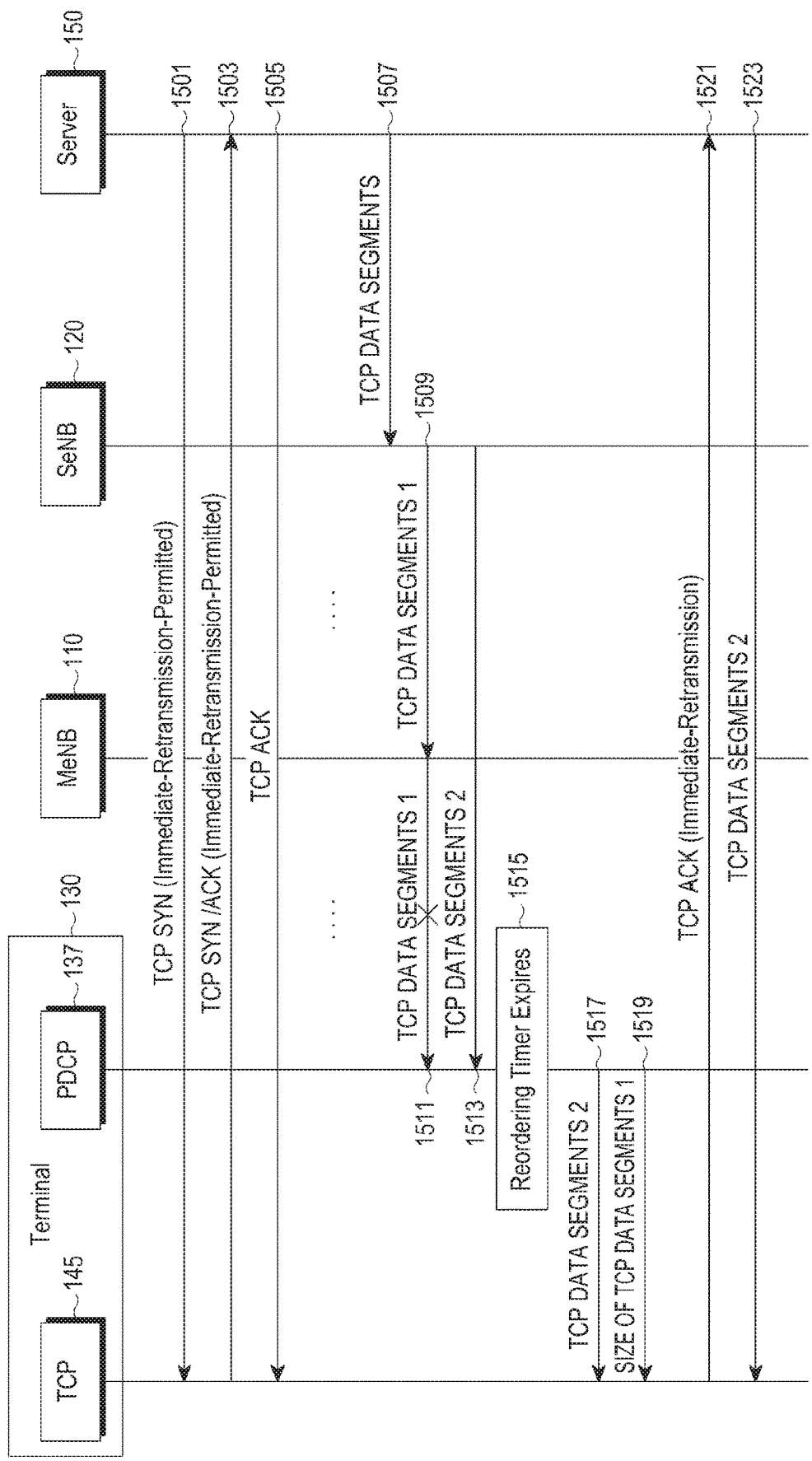
FIG. 15 schematically illustrates still another example of a process of transmitting and receiving data in a communication system supporting dual connectivity according to an embodiment of the present disclosure.

FIG. 15 schematically illustrates still another example of a process of transmitting and receiving data in a communication system supporting dual connectivity according to an embodiment of the present disclosure.

Referring to FIG. 15, it will be noted that a process of transmitting and receiving data in FIG. 15 is a process of transmitting and receiving data in a case that a TCP layer in a terminal immediately retransmits a TCP segment which is lost due to transmission delay of a radio link.

In FIG. 15, a terminal 130 includes a TCP layer 145 and a PDCP layer 137. For convenience, it will be noted that layers which are not directly related to a process of transmitting and receiving data according to an embodiment of the present disclosure are not shown, and a structure of a communication system to which the terminal 130 is connected is the same as a structure of a communication system in FIG. 1.

Referring to FIG. 15, a TCP layer 145 in a terminal 130 generates a TCP session through a TCP 3-way handshake with a server 150. That is, the server 150 transmits a TCP synchronization (TCP SYN) message to the TCP layer 145 in the terminal at operation 1501. At this time, the TCP SYN message includes an option for Immediate-Retransmission-Permitted informing that an immediate retransmission function may be performed.

The TCP layer 145 in the terminal 130 transmits a response message in response to the TCP SYN message received from the server 150 while transmitting the TCP SYN message to the server 150 at operation 1503. The TCP SYN message transmitted from the terminal 130 to the server 150 includes an option for Immediate-Retransmission-Permitted informing that an immediate retransmission function may be performed. The server 150 transmits, to the terminal 130, a response message in response to the TCP SYN message received from the terminal 130 at operation 1505.

If all of the TCP SYN message transmitted from the terminal 130 and the TCP SYN message transmitted from the server 150 include the option for Immediate-Retransmission-Permitted, an immediate retransmission function may be activated in an established TCP session if necessary.

After receiving TCP DATA SEGMENTs from the server 150 at operation 1507, the MeNB 110 determines a routing path through which TCP DATA SEGMENTs received according to a preset routing rule will be transmitted to the terminal 130. For example, the MeNB 110 may determine that the SeNB 120 will transmit a part of TCP DATA SEGMENTs, e.g., a TCP DATA SEGMENT 1 to the terminal 130, and the MeNB 110 will transmit the remaining part of the TCP DATA SEGMENTs, e.g., a TCP DATA SEGMENT 2 to the terminal 130.

In this case, the MeNB 110 transmits the TCP DATA SEGMENT 1 to the SeNB 120 at operation 1509. If a temporary blockage occurs in a link of an mmW band, the SeNB 120 does not succeed in transmitting the TCP DATA SEGMENT 1 to the terminal 130 at operation 1511. The MeNB 110 successfully transmits the TCP DATA SEGMENT 2 to the terminal 130 at operation 1513.

The PDCP layer 137 in the terminal 130 waits for reception of a TCP DATA SEGMENT from the SeNB 120 and the MeNB 110. If SNs of one or more than one segments among segments included in the TCP DATA SEGMENT 1 are less than SNs of segments included in the TCP DATA SEGMENT 2, the PDCP layer 137 in the terminal 130 stores a PDCP PDU including the TCP DATA SEGMENT 1 at a reception buffer, starts a reordering timer, and enters into an idle state for receiving a PDCP PDU which is not received in order to sequentially deliver data. If the reordering timer expires at operation 1515, the PDCP layer 137 in the terminal 130 delivers a PDCP PDU including the received TCP DATA SEGMENT 2 to the TCP layer 145 at operation 1517.

The PDCP layer 137 in the terminal 130 delivers a size of the TCP DATA SEGMENT 1 which is not received to the TCP layer 145 at operation 1519. Upon receiving the size of the TCP DATA SEGMENT 1 which is not received from the PDCP layer 137, the TCP layer 145 in the terminal 130 transmits, to the server 150, a TCP response message including an option for requesting Immediate-Retransmission in order to receive the TCP DATA SEGMENT 1 as soon as possible at operation 1521. The option for requesting the Immediate-Retransmission includes information related to amount, e.g., bytes, of the TCP DATA SEGMENT 1 which should be immediately retransmitted in a TCP layer in the server 150. Upon receiving the TCP response message including the option for requesting the Immediate-Retransmission, the server 150 generates a TCP DATA SEGMENT 1 corresponding to amount of a TCP DATA SEGMENT 1 indicated by an Immediate-Retransmission option from information related to an Acknowledgment number included in a header in the TCP response message, and retransmits the TCP DATA SEGMENT 1 to the TCP layer 145 in the terminal 130.

Various examples of a process of transmitting and receiving data in a communication system supporting dual connectivity according to an embodiment of the present disclosure have been described with reference to FIGS. 1 to 15, and inner structures of apparatuses of performing an operation corresponding to various examples of a process of transmitting and receiving data in a communication system supporting dual connectivity according to an embodiment of the present disclosure will be described with reference to FIGS. 16 to 19.

An inner structure of an MeNB in a communication system supporting dual connectivity according to an embodiment of the present disclosure will be described with reference to FIG. 16.

Figure 16:
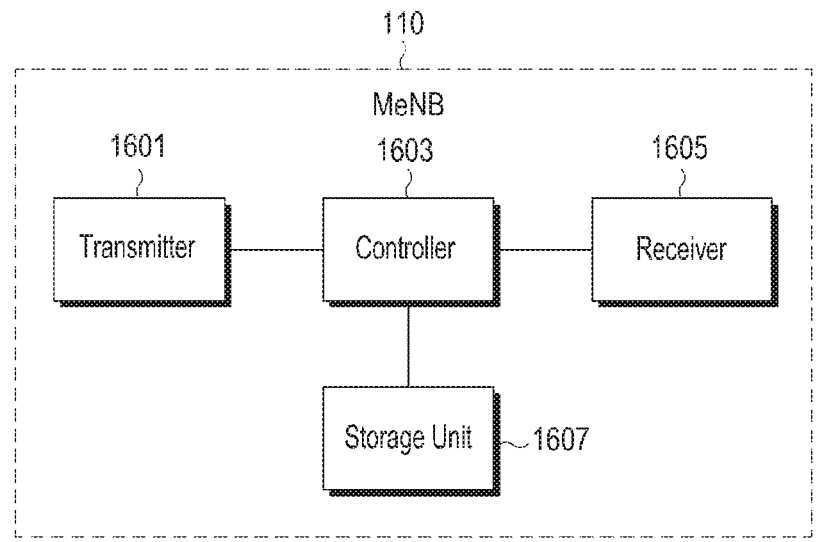
FIG. 16 schematically illustrates an inner structure of an MeNB in a communication system supporting dual connectivity according to an embodiment of the present disclosure.

FIG. 16 schematically illustrates an inner structure of an MeNB in a communication system supporting dual connectivity according to an embodiment of the present disclosure.

Referring to FIG. 16, an MeNB 110 includes a transmitter 1601, a controller 1603, a receiver 1605, and a storage unit 1607.

The controller 1603 controls the overall operation of the MeNB 110. More particularly, the controller 1603 controls an operation related to an operation of transmitting and receiving data in a communication system supporting dual connectivity according to embodiments of the present disclosure. The operation related to the operation of transmitting and receiving the data in the communication system supporting the dual connectivity according to embodiments of the present disclosure has been described with FIGS. 1 to 15, and a detailed description thereof will be omitted herein.

The transmitter 1601 transmits various signals and various messages to other entities, e.g., an SeNB, a terminal, and/or the like in the communication system supporting the dual connectivity under a control of the controller 1603. The various signals and various messages transmitted in the transmitter 1601 have been described with reference to FIGS. 1 to 15, and a detailed description thereof will be omitted herein.

The receiver 1605 receives various signals and various messages from other entities, e.g., an SeNB, a terminal, and/or the like in the communication system supporting the dual connectivity under a control of the controller 1603. The various signals and various messages received in the receiver 1605 have been described with reference to FIGS. 1 to 15, and a detailed description thereof will be omitted herein.

The storage unit 1607 stores various programs, various data, and/or the like related to an operation related to an operation of transmitting and receiving data in a communication system supporting dual connectivity according to embodiments of the present disclosure, performed in the MeNB 110 under a control of the controller 1603.

The storage unit 1607 stores various signals and various messages which are received by the receiver 1605 from the other entities.

While the transmitter 1601, the controller 1603, the receiver 1605, and the storage unit 1607 are described in the MeNB 110 as separate units, it is to be understood that this is merely for convenience of description. In other words, two or more of the transmitter 1601, the controller 1603, the receiver 1605, and the storage unit 1607 may be incorporated into a single unit.

The MeNB 110 may be implemented with one processor.

An inner structure of an MeNB in a communication system supporting dual connectivity according to an embodiment of the present disclosure has been described with reference to FIG. 16, and an inner structure of an SeNB in a communication system supporting dual connectivity according to an embodiment of the present disclosure will be described with reference to FIG. 17.

Figure 17:
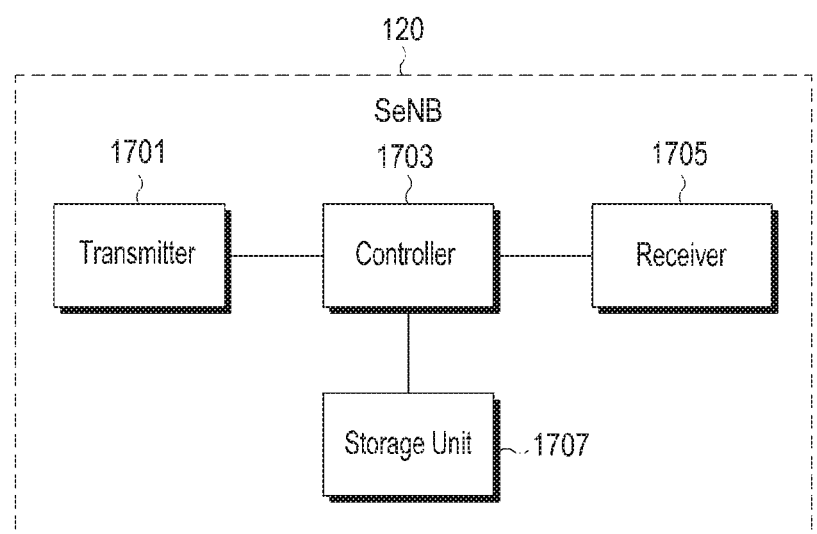
FIG. 17 schematically illustrates an inner structure of an SeNB in a communication system supporting dual connectivity according to an embodiment of the present disclosure.

FIG. 17 schematically illustrates an inner structure of an SeNB in a communication system supporting dual connectivity according to an embodiment of the present disclosure.

Referring to FIG. 17, an SeNB 120 includes a transmitter 1701, a controller 1703, a receiver 1705, and a storage unit 1707.

The controller 1703 controls the overall operation of the SeNB 120. More particularly, the controller 1703 controls an operation related to an operation of transmitting and receiving data in a communication system supporting dual connectivity according to embodiments of the present disclosure. The operation related to the operation of transmitting and receiving the data in the communication system supporting the dual connectivity according to embodiments of the present disclosure has been described with FIGS. 1 to 15, and a detailed description thereof will be omitted herein.

The transmitter 1701 transmits various signals and various messages to other entities, e.g., an MeNB, a terminal, and/or the like in the communication system supporting the dual connectivity under a control of the controller 1703. The various signals and various messages transmitted in the transmitter 1701 have been described with reference to FIGS. 1 to 15, and a detailed description thereof will be omitted herein.

The receiver 1705 receives various signals and various messages from other entities, e.g., an MeNB, a terminal, and/or the like in the communication system supporting the dual connectivity under a control of the controller 1703. The various signals and various messages received in the receiver 1705 have been described with reference to FIGS. 1 to 15, and a detailed description thereof will be omitted herein.

The storage unit 1707 stores various programs, various data, and/or the like related to an operation related to an operation of transmitting and receiving data in a communication system supporting dual connectivity according to embodiments of the present disclosure, performed in the SeNB 120 under a control of the controller 1703.

The storage unit 1707 stores various signals and various messages which are received by the receiver 1705 from the other entities.

While the transmitter 1701, the controller 1703, the receiver 1705, and the storage unit 1707 are described in the SeNB 120 as separate units, it is to be understood that this is merely for convenience of description. In other words, two or more of the transmitter 1701, the controller 1703, the receiver 1705, and the storage unit 1707 may be incorporated into a single unit.

The SeNB 120 may be implemented with one processor.

An inner structure of an SeNB in a communication system supporting dual connectivity according to an embodiment of the present disclosure has been described with reference to FIG. 17, and an inner structure of a terminal in a communication system supporting dual connectivity according to an embodiment of the present disclosure will be described with reference to FIG. 18.

Figure 18:
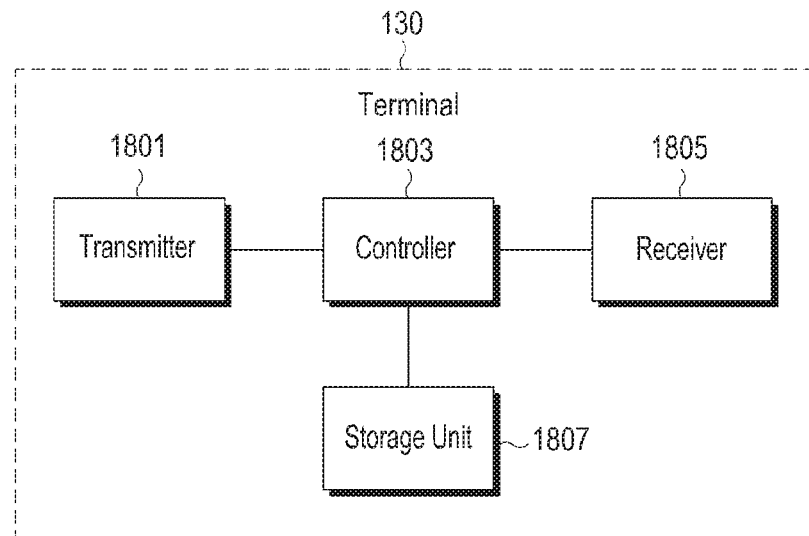
FIG. 18 schematically illustrates an inner structure of a terminal in a communication system supporting dual connectivity according to an embodiment of the present disclosure.

FIG. 18 schematically illustrates an inner structure of a terminal in a communication system supporting dual connectivity according to an embodiment of the present disclosure.

Referring to FIG. 18, a terminal 130 includes a transmitter 1801, a controller 1803, a receiver 1805, and a storage unit 1807.

The controller 1803 controls the overall operation of the terminal 130. More particularly, the controller 1803 controls an operation related to an operation of transmitting and receiving data in a communication system supporting dual connectivity according to embodiments of the present disclosure. The operation related to the operation of transmitting and receiving the data in the communication system supporting the dual connectivity according to embodiments of the present disclosure has been described with FIGS. 1 to 15, and a detailed description thereof will be omitted herein.

The transmitter 1801 transmits various signals and various messages to other entities, e.g., an MeNB, an SeNB, and/or the like in the communication system supporting the dual connectivity under a control of the controller 1803. The various signals and various messages transmitted in the transmitter 1801 have been described with reference to FIGS. 1 to 15, and a detailed description thereof will be omitted herein.

The receiver 1805 receives various signals and various messages from other entities, e.g., an MeNB, an SeNB, and/or the like in the communication system supporting the dual connectivity under a control of the controller 1803. The various signals and various messages received in the receiver 1805 have been described with reference to FIGS. 1 to 15, and a detailed description thereof will be omitted herein.

The storage unit 1807 stores various programs, various data, and/or the like related to an operation related to an operation of transmitting and receiving data in a communication system supporting dual connectivity according to embodiments of the present disclosure, performed in the terminal 130 under a control of the controller 1803.

The storage unit 1807 stores various signals and various messages which are received by the receiver 1805 from the other entities.

While the transmitter 1801, the controller 1803, the receiver 1805, and the storage unit 1807 are described in the terminal 130 as separate units, it is to be understood that this is merely for convenience of description. In other words, two or more of the transmitter 1801, the controller 1803, the receiver 1805, and the storage unit 1807 may be incorporated into a single unit.

The terminal 130 may be implemented with one processor.

An inner structure of an SeNB in a communication system supporting dual connectivity according to an embodiment of the present disclosure has been described with reference to FIG. 18, and an inner structure of an EPC in a communication system supporting dual connectivity according to an embodiment of the present disclosure will be described with reference to FIG. 19.

Figure 19:
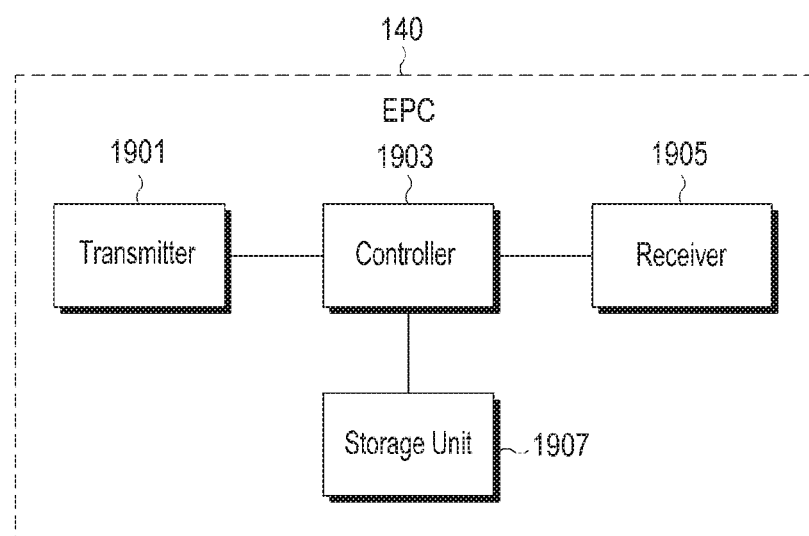
FIG. 19 schematically illustrates an inner structure of an EPC in a communication system supporting dual connectivity according to an embodiment of the present disclosure.

FIG. 19 schematically illustrates an inner structure of an EPC in a communication system supporting dual connectivity according to an embodiment of the present disclosure.

Referring to FIG. 19, an EPC 140 includes a transmitter 1901, a controller 1903, a receiver 1905, and a storage unit 1907.

The controller 1903 controls the overall operation of the EPC 140. More particularly, the controller 1903 controls an operation related to an operation of transmitting and receiving data in a communication system supporting dual connectivity according to embodiments of the present disclosure. The operation related to the operation of transmitting and receiving the data in the communication system supporting the dual connectivity according to embodiments of the present disclosure has been described with FIGS. 1 to 15, and a detailed description thereof will be omitted herein.

The transmitter 1901 transmits various signals and various messages to other entities, e.g., an MeNB, an SeNB, and/or the like in the communication system supporting the dual connectivity under a control of the controller 1903. The various signals and various messages transmitted in the transmitter 1901 have been described with reference to FIGS. 1 to 15, and a detailed description thereof will be omitted herein.

The receiver 1905 receives various signals and various messages from other entities, e.g., an MeNB, an SeNB, and/or the like in the communication system supporting the dual connectivity under a control of the controller 1903. The various signals and various messages received in the receiver 1905 have been described with reference to FIGS. 1 to 15, and a detailed description thereof will be omitted herein.

The storage unit 1907 stores various programs, various data, and/or the like related to an operation related to an operation of transmitting and receiving data in a communication system supporting dual connectivity according to embodiments of the present disclosure, performed in the EPC 140 under a control of the controller 1903.

The storage unit 1907 stores various signals and various messages which are received by the receiver 1905 from the other entities.

While the transmitter 1901, the controller 1903, the receiver 1905, and the storage unit 1907 are described in the EPC 140 as separate units, it is to be understood that this is merely for convenience of description. In other words, two or more of the transmitter 1901, the controller 1903, the receiver 1905, and the storage unit 1907 may be incorporated into a single unit.

The EPC 140 may be implemented with one processor.

An inner structure of an EPC in a communication system supporting dual connectivity according to an embodiment of the present disclosure has been described with reference to FIG. 19, and an inner structure of a server in a communication system supporting dual connectivity according to an embodiment of the present disclosure will be described with reference to FIG. 20.

Figure 20:
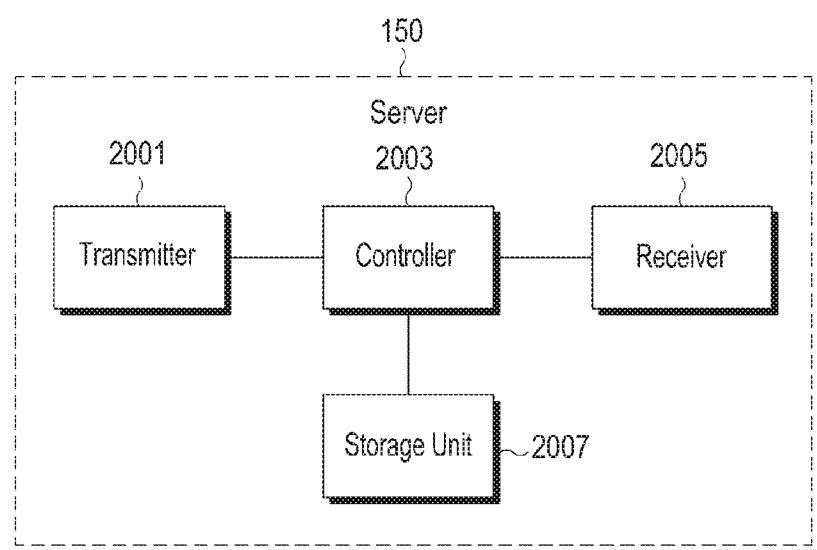
FIG. 20 schematically illustrates an inner structure of a server in a communication system supporting dual connectivity according to an embodiment of the present disclosure.

FIG. 20 schematically illustrates an inner structure of a server in a communication system supporting dual connectivity according to an embodiment of the present disclosure.

Referring to FIG. 20, a server 150 includes a transmitter 2001, a controller 2003, a receiver 2005, and a storage unit 2007.

The controller 2003 controls the overall operation of the server 150. More particularly, the controller 2003 controls an operation related to an operation of transmitting and receiving data in a communication system supporting dual connectivity according to embodiments of the present disclosure. The operation related to the operation of transmitting and receiving the data in the communication system supporting the dual connectivity according to embodiments of the present disclosure has been described with FIGS. 1 to 15, and a detailed description thereof will be omitted herein.

The transmitter 2001 transmits various signals and various messages to other entities, e.g., an MeNB, an SeNB, and/or the like in the communication system supporting the dual connectivity under a control of the controller 2003. The various signals and various messages transmitted in the transmitter 2001 have been described with reference to FIGS. 1 to 15, and a detailed description thereof will be omitted herein.

The receiver 2005 receives various signals and various messages from other entities, e.g., an MeNB, an SeNB, and/or the like in the communication system supporting the dual connectivity under a control of the controller 2003. The various signals and various messages received in the receiver 2005 have been described with reference to FIGS. 1 to 15, and a detailed description thereof will be omitted herein.

The storage unit 2007 stores various programs, various data, and/or the like related to an operation related to an operation of transmitting and receiving data in a communication system supporting dual connectivity according to embodiments of the present disclosure, performed in the server 150 under a control of the controller 2003.

The storage unit 2007 stores various signals and various messages which are received by the receiver 2005 from the other entities.

While the transmitter 2001, the controller 2003, the receiver 2005, and the storage unit 2007 are described in the server 150 as separate units, it is to be understood that this is merely for convenience of description. In other words, two or more of the transmitter 2001, the controller 2003, the receiver 2005, and the storage unit 2007 may be incorporated into a single unit.

The server 150 may be implemented with one processor.

In accordance with various embodiments of the present disclosure, an operating method of a first evolved node B (eNB) in a communication system supporting dual connectivity is provided. The operating method includes detecting that a path between a second eNB and a terminal is blocked; and transmitting, to the terminal, a first data unit of a plurality of data units to be transmitted through the path between the second eNB and the terminal.

Preferably, the operating method further comprises determining that the first data unit is to be transmitted through the path between the second eNB and the terminal and determining that a second data unit among the plurality of data units is to be transmitted through a path between the first eNB and the terminal; and transmitting information indicating the determined result to the terminal.

Preferably, the operating method further comprises transmitting, to the second eNB, control information related to a sequence number (SN) of a data unit which is successfully transmitted to the terminal; and receiving information indicating that the path between the second eNB and the terminal is recovered from the second eNB.

Preferably, the operating method further comprises receiving, from the terminal, the information indicating that the path between the second eNB and the terminal is blocked.

Preferably, the operating method further comprises receiving, from the second eNB, information indicating that the path between the second eNB and the terminal is blocked.

Preferably, the first data unit is determined based on priorities of data units which are able to be retransmitted if the blocked path is recovered among the plurality of data units.

Preferably, the operating method further comprises establishing a path between the second eNB and the first eNB; and receiving the first data unit from the second eNB through the established path.

In accordance with various embodiments of the present disclosure, an operating method of a second evolved node B (eNB) in a communication system supporting dual connectivity is provided. The operating method includes detecting that a path between a second eNB and a terminal is blocked; and transmitting, to a first eNB, information indicating that the path between the second eNB and the terminal is blocked.

Preferably, the detecting that the path between the second eNB and the terminal is blocked comprises detecting that the path between the second eNB and the terminal is temporarily blocked if retransmission of a data packet is not performed up to a preset number of retransmission attempts.

Preferably, the operating method further comprises receiving information about a sequence number (SN) of a data packet which is successfully transmitted from the first eNB to the terminal; and transmitting information indicating that the path between the second eNB and the terminal is recovered to the first eNB if the path between the second eNB and the terminal is recovered.

Preferably, the operating method further comprises establishing a path between the second eNB and the first eNB; and transmitting data to be transmitted through the path between the second eNB and the terminal to the first eNB through the established path.

In accordance with various embodiments of the present disclosure, an operating method of a terminal in a communication system supporting dual connectivity is provided. The operating method includes detecting that a path between a first evolved node B (eNB) and a terminal is blocked; transmitting, to a second eNB, information indicating that the path between the first eNB and the terminal is blocked; and receiving, from the second eNB, a first data packet of a plurality of data packets to be transmitted through the path between the first eNB and the terminal.

Preferably, the operating method further comprises receiving, from the first eNB, information indicating that the first data packet is transmitted through the path between the first eNB and the terminal, and a second data packet among the plurality of data packets is transmitted through a path between the second eNB and the terminal.

Preferably, the detecting that the path between the first eNB and the terminal is blocked comprises detecting that the path between the first eNB and the terminal is temporarily blocked if a timer of detecting a temporary blockage between the first eNB and the terminal expires.

In accordance with various embodiments of the present disclosure, an operating method of an evolved packet core (EPC) in a communication system supporting dual connectivity is provided. The operating method includes transmitting and receiving a message including information indicating that a retransmission function is able to be performed with a terminal through a transmission control protocol (TCP) layer; and receiving a retransmission request message including information related to a data packet which should be retransmitted through the TCP layer, and transmitting the data packet through the TCP layer based on the retransmission request message.

Preferably, the message is transmitted and received in a procedure of establishing a TCP session with the terminal.

Preferably, the information related to the data packet which should be retransmitted includes information about amount of the data packet which should be retransmitted.

In an embodiment of the present disclosure, an MeNB may effectively reorder data in a PDCP layer in a terminal by additionally providing routing information for routed data or data to be routed. According to an embodiment of the present disclosure, delay due to data reordering may be reduced and transmission efficiency of data transmitted to an upper layer may be increased.

In an embodiment of the present disclosure, a terminal may re-route data which an MeNB has routed through a transmission path for a radio link through other path by detecting a temporary blockage of the radio link and notifying the MeNB of the detected result. According to an embodiment of the present disclosure, delay for transmission that occurs due to a temporary blockage of a radio link may be reduced and transmission efficiency of data transmitted to an upper layer may be increased.

In an embodiment of the present disclosure, an SeNB may re-route data which an MeNB has routed through a transmission path for a radio link through other path by detecting a temporary blockage of the radio link and notifying the MeNB of the detected result. According to an embodiment of the present disclosure, delay for transmission that occurs due to a temporary blockage of a radio link may be reduced and transmission efficiency of data transmitted to an upper layer may be increased.

In an embodiment of the present disclosure, an MeNB may re-route data which has been routed through a transmission path for a radio link through other path after detecting a temporary blockage of the radio link. According to an embodiment of the present disclosure, delay for transmission that occurs due to a temporary blockage of a radio link may be reduced and transmission efficiency of data transmitted to an upper layer may be increased.

In an embodiment of the present disclosure, a terminal detects a temporary blockage of a radio link to notify an MeNB of the detected result, so the MeNB may receive data which is being buffered in an SeNB from the SeNB to transmit the received data to the terminal. According to an embodiment of the present disclosure, delay for transmission which occurs due to a temporary blockage of a radio link may be reduced and transmission efficiency of data transmitted to an upper layer may be increased.

In an embodiment of the present disclosure, an SeNB detects a temporary blockage of a radio link to notify an MeNB of the detected result, so the MeNB may receive data which is being buffered in the SeNB from the SeNB to transmit the received data to a terminal. According to an embodiment of the present disclosure, delay for transmission which occurs due to a temporary blockage of a radio link may be reduced and transmission efficiency of data transmitted to an upper layer may be increased.

In an embodiment of the present disclosure, a TCP layer in a terminal may reduce delay for transmission which occurs due to a temporary blockage of a radio link and increase transmission efficiency of data transmitted to an upper layer by requesting to immediately transmit loss of a TCP segment due to the temporary blockage of the radio link from a TCP layer in a server.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A second base station in a communication system supporting a dual connectivity wherein a terminal is connected to a first base station and the second base station, the second base station comprising:
   at least one processor configured to:
      identify a blockage of a link between the second base station and the terminal, and
      identify that the link is recovered; and
   a transmitter configured to:
      transmit, to the first base station, a first message including information indicating the blockage of the link, and
      transmit, to the first base station, a second message including information indicating that the link is recovered,
      wherein the first message comprises a sequence number (SN) of at least one lost data unit, a highest SN of successfully delivered data units, and a highest SN of transmitted data units in the link between the second base station and the terminal, and wherein the link is unremoved after the first message is transmitted.

2. The second base station of claim 1, wherein the at least one processor is configured to identify the blockage of the link if a retransmission of a data unit is not successful within a preset number of retransmissions.

3. The second base station of claim 1, further comprising:
a receiver configured to receive, from the first base station, a third message including information indicating at least one data unit to be discarded in the second base station.

4. The second base station of claim 3, wherein the at least one processor is further configured to discard the at least one data unit.

5. The second base station of claim 3, wherein the information included in the third message comprises an SN of the at least one data unit.

6. The second base station of claim 1, wherein each of the first message and the second message is a part of a downlink data delivery status frame.

7. A first base station in a communication system supporting a dual connectivity wherein a terminal is connected to the first base station and a second base station, the first base station comprising:
a receiver configured to:
receive, from the second base station, a first message including information indicating a blockage of a link between the second base station and the terminal, and
receive, from the second base station, a second message including information indicating that the second base station has identified that the link is recovered; and
at least one processor configured to:
re-route transmission of at least one data unit which the second base station reports as at least one lost data unit in the link in response to receiving the first message, and
control the second base station to resume the transmission to the terminal in response to receiving the second message,
wherein the first message comprises a sequence number (SN) of at least one lost data unit, a highest SN of successfully delivered data units, and a highest SN of transmitted data units in the link between the second base station and the terminal, and
wherein the link is unremoved after the first message is received.

8. The first base station of claim 7, further comprising:
a transmitter configured to transmit a third message including information indicating at least one data unit to be discarded in the second base station after the receiver receives the second message.

9. The first base station of claim 8, wherein the information included in the third message comprises an SN of the at least one data unit.

10. The first base station of claim 7, wherein each of the first message and the second message is a part of a downlink data delivery status frame.

11. A method of a second base station in a communication system supporting a dual connectivity wherein a terminal is connected to a first base station and the second base station, the method comprising:
identifying a blockage of a link between the second base station and the terminal;
transmitting, to the first base station, a first message which includes information indicating the blockage of the link;
identifying that the link is recovered; and
transmitting, to the first base station, a second message including information indicating that the link is recovered,
wherein the first message comprises a sequence number (SN) of at least one lost data unit, a highest SN of successfully delivered data units, and a highest SN of transmitted data units in the link between the second base station and the terminal, and
wherein the link is unremoved after the first message is transmitted.

12. The method of claim 11, wherein identifying the blockage of the link comprises identifying the blockage of the link if a retransmission of a data unit is not successful within a preset number of retransmissions.

13. The method of claim 11, further comprising:
receiving, from the first base station, a third message including information indicating at least one data unit to be discarded in the second base station.

14. The method of claim 13, further comprising:
discarding the at least one data unit.

15. The method of claim 13, wherein the information included in the third message comprises an SN of the at least one data unit.

16. The method of claim 11, wherein each of the first message and the second message is a part of a downlink data delivery status frame.

17. A method of a first base station in a communication system supporting a dual connectivity wherein a terminal is connected to the first base station and a second base station, the method comprising:
receiving, from the second base station, a first message including information indicating a blockage of a link between the second base station and the terminal;
re-routing transmission of at least one data unit which the second base station reports as at least one lost data unit in the link in response to receiving the first message;
receiving, from the second base station, a second message including information indicating that the second base station has identified that the link is recovered; and
controlling the second base station to resume the transmission to the terminal in response to receiving the second message,
wherein the first message comprises a sequence number (SN) of at least one lost data unit, a highest SN of successfully delivered data units, and a highest SN of transmitted data units in the link between the second base station and the terminal, and
wherein the link is unremoved after the first message is received.

18. The method of claim 17, further comprising:
transmitting a third message including information indicating at least one data unit to be discarded in the second base station after receiving the second message.

19. The method of claim 18, wherein the information included in the third message comprises an SN of the at least one data unit.

20. The method of claim 17, wherein each of the first message and the second message is a part of a downlink data delivery status frame.

* * * * *